US012320379B2

(12) United States Patent
Woodlief

(10) Patent No.: US 12,320,379 B2
(45) Date of Patent: Jun. 3, 2025

(54) TANK COVER AND COVER SYSTEMS

(71) Applicant: Enduro Composites, Inc, Houston, TX (US)

(72) Inventor: Wallace S. Woodlief, Houston, TX (US)

(73) Assignee: ENDURO COMPOSITES, INC., Houston, TX (US)

( * ) Notice: Subject to any disclaimer, the term of this patent is extended or adjusted under 35 U.S.C. 154(b) by 674 days.

(21) Appl. No.: 17/539,957

(22) Filed: Dec. 1, 2021

(65) Prior Publication Data
US 2022/0170500 A1 Jun. 2, 2022

Related U.S. Application Data

(60) Provisional application No. 63/120,006, filed on Dec. 1, 2020.

(51) Int. Cl.
*F16B 39/10* (2006.01)
*C02F 1/00* (2023.01)

(52) U.S. Cl.
CPC .............. *F16B 39/101* (2013.01); *C02F 1/00* (2013.01); *C02F 2203/006* (2013.01)

(58) Field of Classification Search
CPC .... F16B 39/101; C02F 1/00; C02F 2203/006; E04F 15/105; E04F 2201/0517; E04F 2201/0523; A01K 1/0151; E04B 1/6108; F24F 13/082
See application file for complete search history.

(56) References Cited

U.S. PATENT DOCUMENTS

| 3,290,131 | A | | 12/1966 | Neal, Jr. |
| 3,443,350 | A | * | 5/1969 | Birum, Jr. ............... E04B 2/967 52/459 |
| 4,128,983 | A | | 12/1978 | Matsubara |
| 4,719,731 | A | | 1/1988 | Ravotti et al. |
| 5,921,030 | A | | 7/1999 | Ducotey et al. |
| 6,209,275 | B1 | * | 4/2001 | Cates ................... E04B 2/7453 52/762 |
| 10,294,677 | B1 | * | 5/2019 | Casey .................. E04F 15/08 |
| 10,934,714 | B1 | * | 3/2021 | McManus ............. E04D 11/007 |
| 11,371,245 | B2 | * | 6/2022 | McManus ......... E04F 15/02044 |
| 12,063,908 | B2 | * | 8/2024 | Bioret .................. A01K 1/015 |
| 2003/0213202 | A1 | * | 11/2003 | Hutchings ............ A01K 1/0151 52/578 |

(Continued)

FOREIGN PATENT DOCUMENTS

EP 2239783 A1 10/2010

OTHER PUBLICATIONS

International Search Report and Written Opinion dated Feb. 18, 2022 issued in International Application No. PCT/US2021/061435.

*Primary Examiner* — Gisele D Ford
(74) *Attorney, Agent, or Firm* — HUNTON ANDREWS KURTH LLP

(57) ABSTRACT

A cover assembly generally includes a lock channel, flush mounted panels, a fastener, and a nut. Advantageously, the cover and cover systems are corrosion resistant and/or high strength, comprised of removable panels, offer easy installation and access, may be high strength fiber reinforced plastic, offer life cycle cost savings, may be compression sealed, have long relatively maintenance-free life, and/or are customizable.

16 Claims, 26 Drawing Sheets

(56) References Cited

U.S. PATENT DOCUMENTS

| | | | | |
|---|---|---|---|---|
| 2006/0242916 A1* | 11/2006 | Simko | ............... | E04F 19/061 |
| | | | | 52/177 |
| 2011/0047901 A1* | 3/2011 | Dierbeck | ............ | E04F 15/06 |
| | | | | 52/173.1 |
| 2013/0219806 A1* | 8/2013 | Carrubba | ........... | E04F 15/105 |
| | | | | 52/302.1 |
| 2013/0320166 A1 | 12/2013 | Kemple et al. | | |
| 2014/0260043 A1* | 9/2014 | Cottier | ............ | E04F 13/0894 |
| | | | | 52/489.2 |
| 2016/0134229 A1* | 5/2016 | Hsueh | ................ | H02S 20/23 |
| | | | | 52/173.3 |
| 2017/0030086 A1* | 2/2017 | Rodriguez Lopez | ...................... | |
| | | | | E04F 13/0819 |
| 2017/0051515 A1* | 2/2017 | Aquilani | ............. | E04F 13/18 |
| 2017/0114821 A1* | 4/2017 | DiChiara | ............ | B28B 7/342 |
| 2017/0138062 A1* | 5/2017 | Chen | ................... | B29C 48/92 |
| 2021/0388624 A1* | 12/2021 | Proot | ............... | E04F 19/0463 |

\* cited by examiner

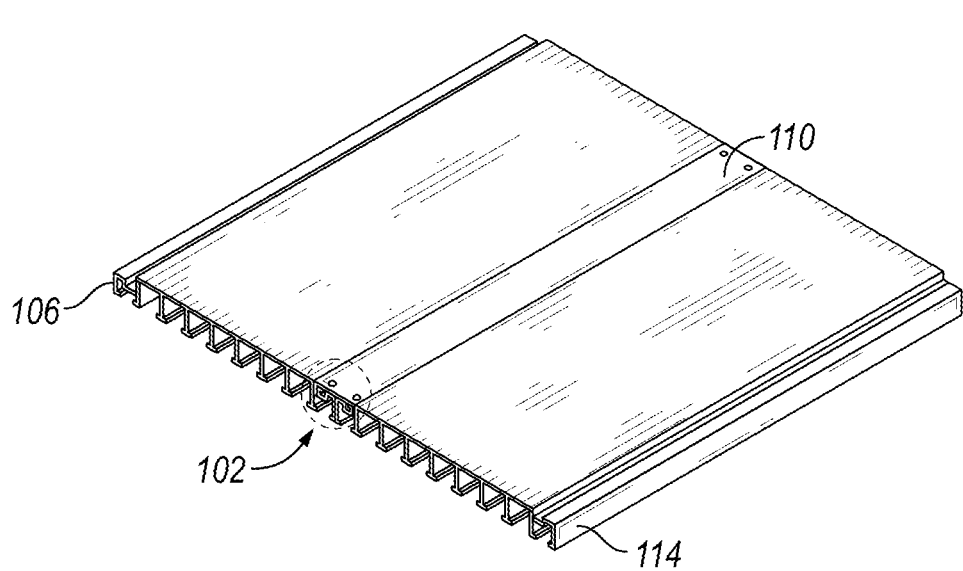
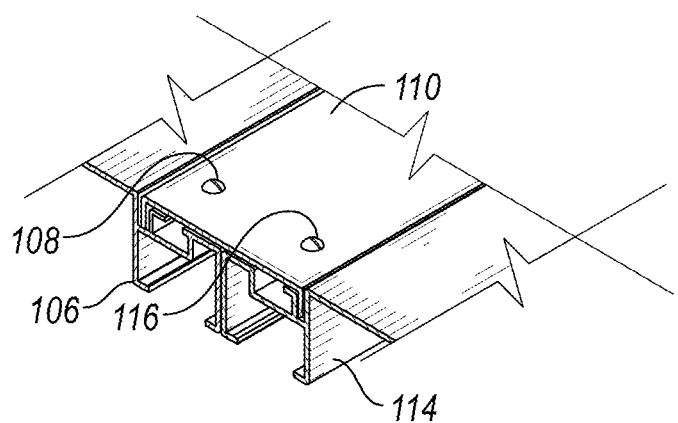
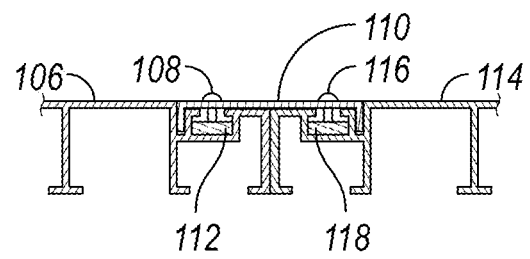
FIG. 1

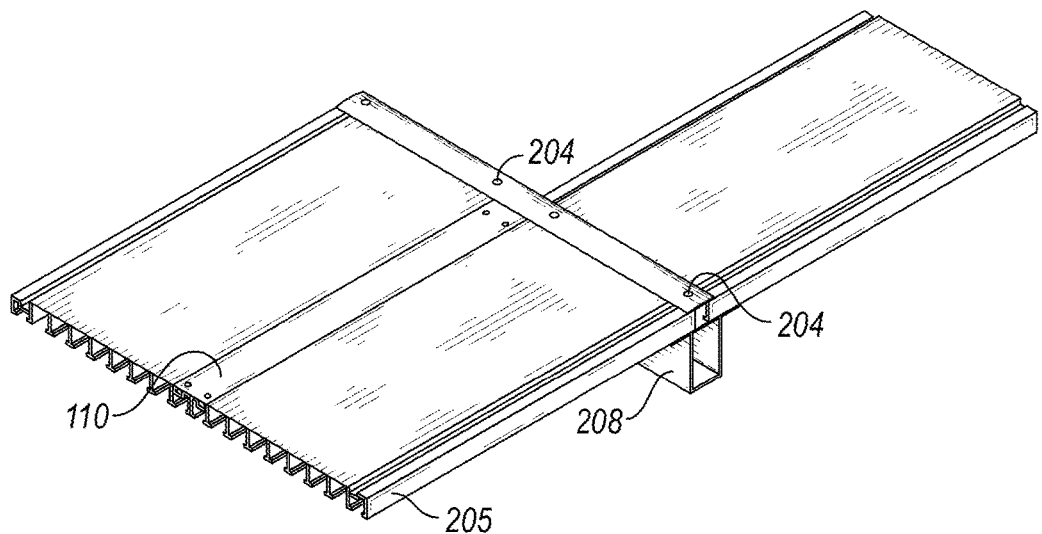
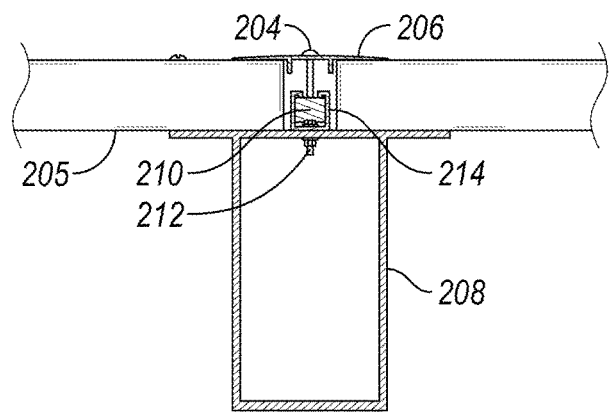
FIG. 2

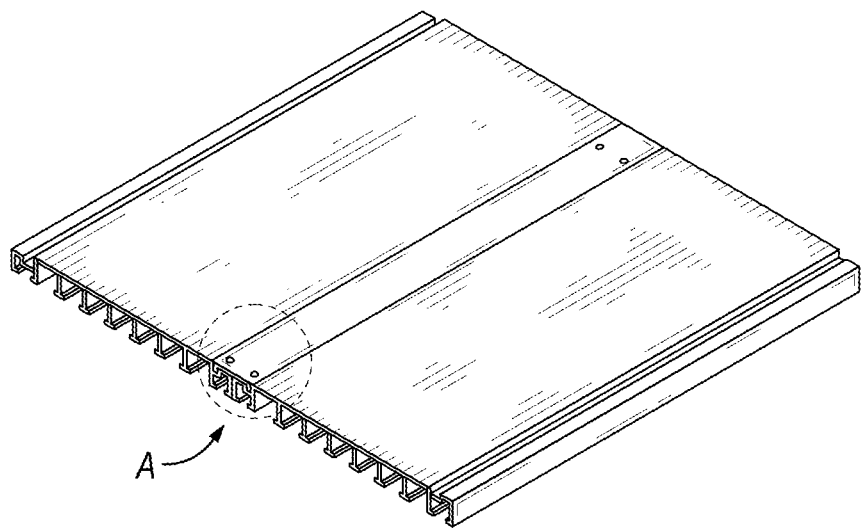
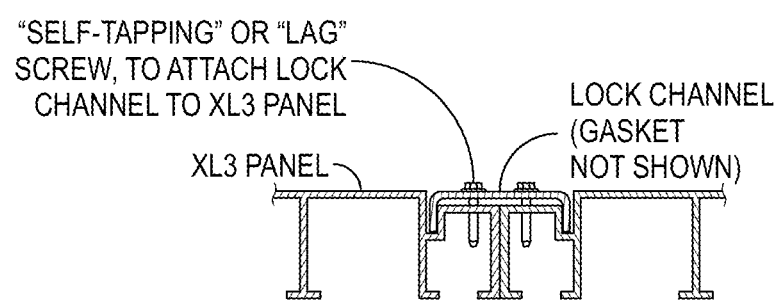
FIG. 3

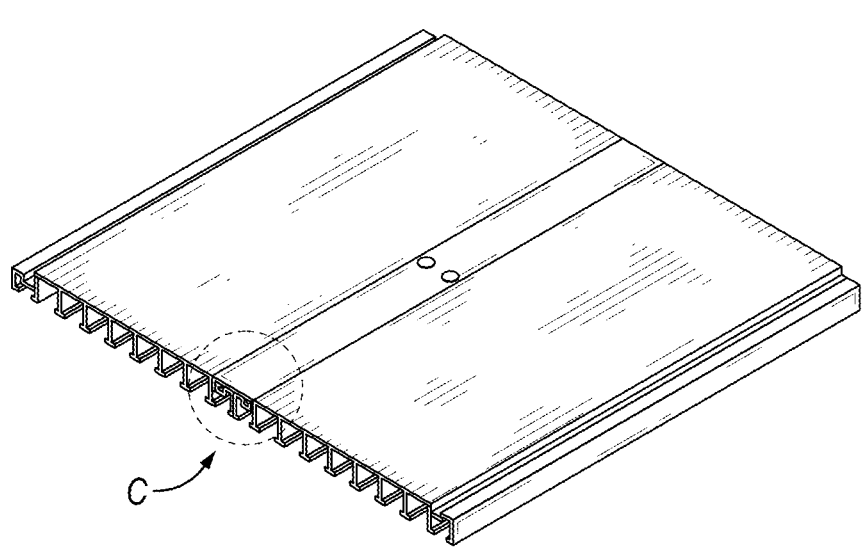
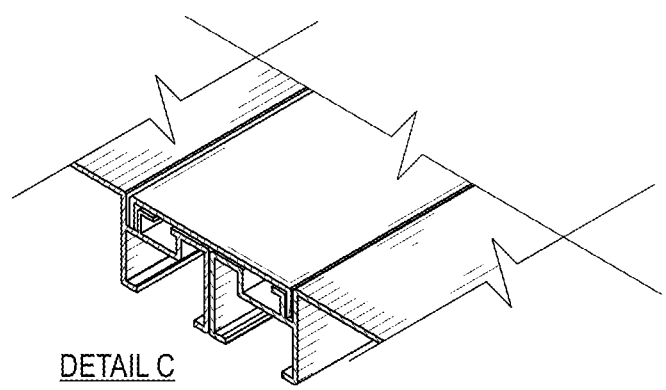
DETAIL C
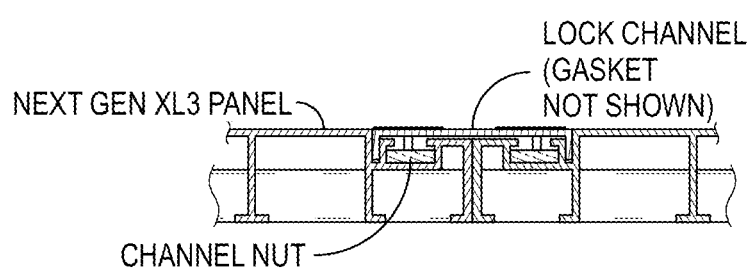
FIG. 4

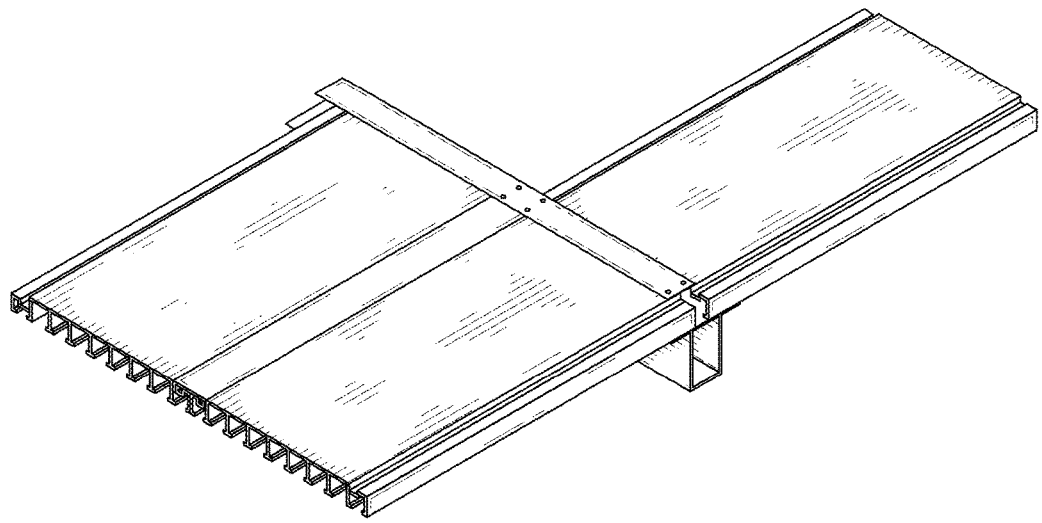
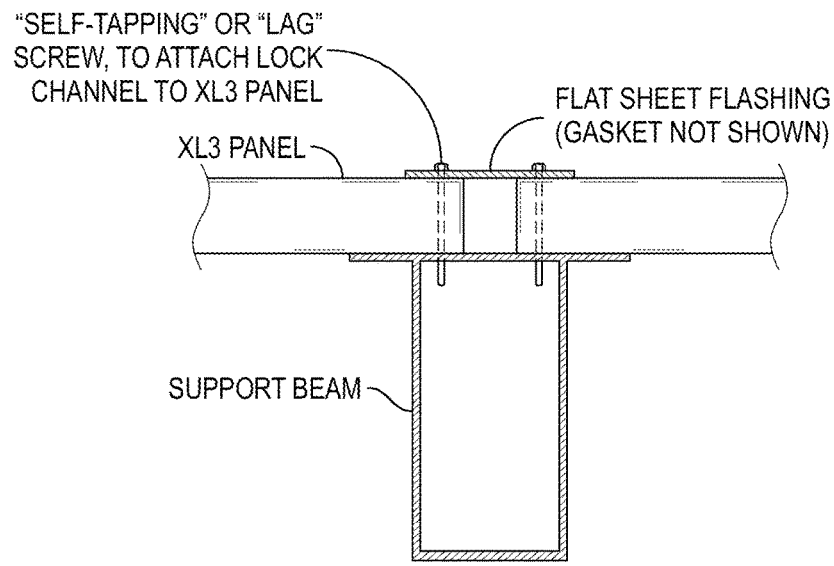
FIG. 5

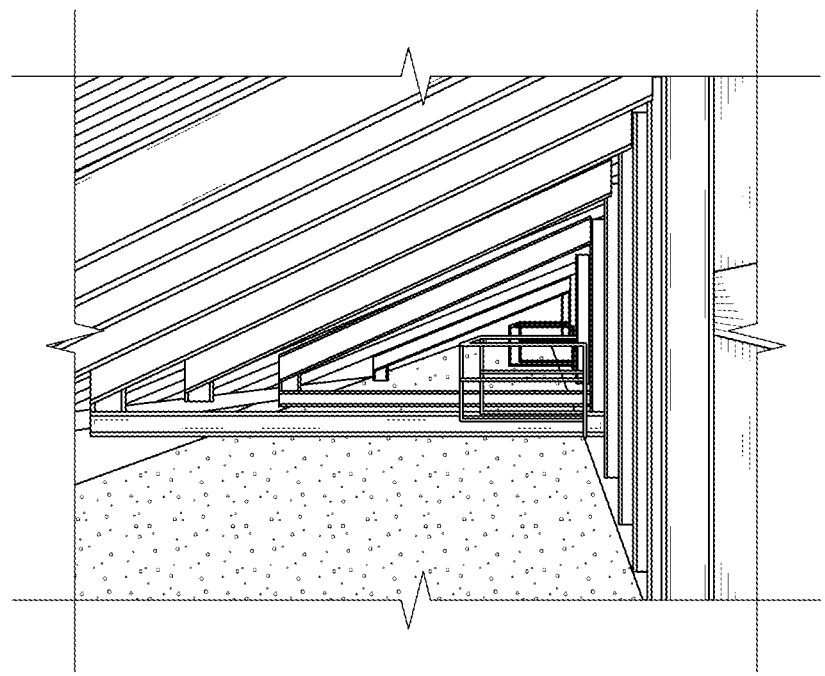
*FIG. 15*
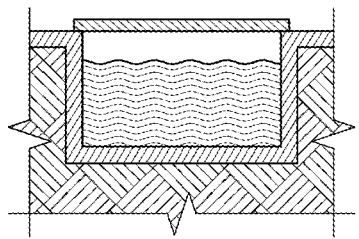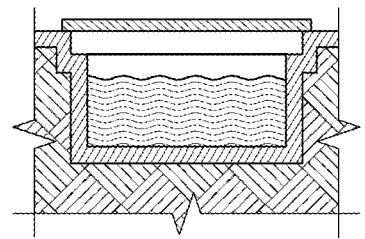
*FIG. 16A*  *FIG. 16B*
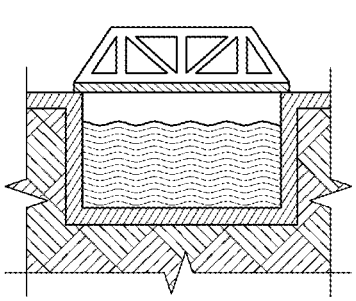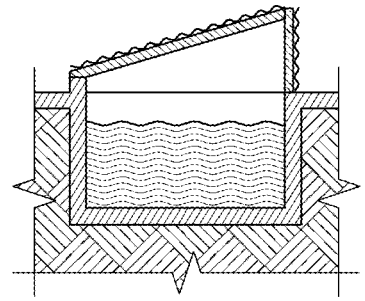
*FIG. 16C*  *FIG. 16D*

MAXIMUM SPANS SHOWN REPRESENT THREE SPAN CONDITION.
DEFLECTION LIMIT = L/60; FACTOR OF SAFETY = 2.5

TANK COVER AND COVER SYSTEMS

CROSS-REFERENCE TO RELATED APPLICATIONS

This application claims priority to U.S. provisional application 63/120,006 filed Dec. 1, 2020 which application is incorporated herein by reference.

FIELD

This invention is related to tank covers used in, for example, water and wastewater systems and operations.

BACKGROUND AND SUMMARY

Although tank covers have been used in various applications, they are often deficient when used in, for example, water and wastewater systems and operations. What is needed are cover and cover systems that are corrosion resistant and/or high strength, comprised of removable panels, offer easy installation, long term operator access, may be high strength fiber reinforced plastic, offer life cycle cost savings, may be compression sealed, have long relatively maintenance-free life, elevate safety of tank cover working environments, and/or are customizable. Advantageously, the covers and systems of the instant application meet many or more of the aforementioned needs. The challenge for today's cover manufacturer is to provide three functionalities: structural performance, sealing odors and accessibility that is long term, functionally consistent and easy. Many covers systems fail in providing equitable performance functionality over time in meeting these needs In general, the application pertains to fiberglass wastewater tank covers with uses including, but not limited to, odor control, water protection, process protection, ultraviolet screen and algae barrier, splash control, freeze and thermal barrier, volatile organic compounds emission control, and improved aesthetics. Without limitation, benefits of the invention include reduced hazards such as tripping, corrosion resistant, high strength, removable panels, easy installation and access, high strength fiber reinforced plastic, life cycle cost savings, compression sealed, long maintenance-free life, and is customizable. Additional benefits may include, for example, removability and removal ease due to the configuration of the connections, easier installation and removability on existing concrete structures (Z flash with strut accommodation), and enhanced safety.

Advantageously by employing the lock channel and nut configurations described herein fewer fasteners may be employed than in prior art configurations. Furthermore, the configurations described herein may be more durable and long-lasting because the fastening system is less likely to need replacing than prior art configurations employing screws in fiberglass that tend to wear due to, for example, hole thread damage and/or enlargement (mechanical wallowing or misshaping) from repeated removal and installation of threaded fasteners. And when components of the systems described herein do wear then they are more readily removable and/or replaceable than in prior systems. Moreover, the connectors may be designed to flush mount resulting in a substantially flat design to, for example, reduce trip hazard. As used herein, "flush mounting" or "flush mounted" means that the top of a cover panel and the adjacent surrounding surface is level such as fully flat or in some cases nearly level with only a slight step up onto the cover. For example, if the basin or tank was a thin rectangle and a single panel spans the width with or without any columns or beams in the tank, then a cover may be mounted on top of the tank with a slight step up. The degree of flatness may vary depending upon the desired configuration and/or other components.

The tank cover assembly and components do not corrode in chemical exposures and wet conditions associated with water and wastewater treatment operations. The pultrusion process used for manufacturing may be configured to produce high content of reinforcing fibers (up to 60% by weight) and strength for long span capability and high load conditions. The tank cover may be custom designed and configured to accommodate most tanks with different shapes, including but not limited to, rectangular or round, and different sizes, including but not limited to small or large. The tank cover may take into account one or more parameters for construction, the one or more parameters including cost budget, material selection, system design, specifications, and/or any combination thereof. The tank cover often comprises a fiberglass reinforced plastic cover.

Further features of the disclosed design, and the advantages offered thereby, are explained in greater detail hereinafter with reference to specific example embodiments illustrated in the accompanying drawings, wherein like elements are indicated be like reference designators.

BRIEF DESCRIPTION OF THE DRAWINGS

FIG. 1 depicts an illustration of panel-to-panel connection according to an exemplary embodiment wherein 110 is flush mounted thereby reducing trip hazards.

FIG. 2 depicts deck end to deck end interface that accommodates an underside positive locking capability to a beam interface at a support beam according to an exemplary embodiment wherein 206 is substantially rounded thereby reducing trip hazard. As an alternative, the strut interface may be integral in the shape of the beam.

FIG. 3 depicts a prior art panel to panel connection wherein as shown in detail A it is not flush mounted as in the instant application.

FIG. 4 depicts an embodiment of a panel to panel connection of this application which is more conducive for long term, repeated removal and reinstallation without damage to the material engagement to the hole or opening shape.

FIG. 5 depicts a prior art panel connections at support beam on the load bearing end of panel and is not tapered. These top surface mount connections have fastener holes in the beams which are often subject to long term wallowing (enlargement and misshaping affecting strength and related compression gasket seal of connection) after repeated installation and removal.

FIG. 15 depicts a Tuff Span™ tank cover system.

FIGS. 16A-16D depicts typical configurations of FRP span tank cover system, wherein FIG. 16A depicts a configuration of flat and clear span; FIG. 16B depicts a configuration of flat and beam-supported; FIG. 16C depicts a configuration of flat and truss-supported; and FIG. 16D depicts a configuration of walk-in and enclosures.

FIG. 27B flush concrete wall; and FIG. 27C end to end.

DETAILED DESCRIPTION

Figure 6:
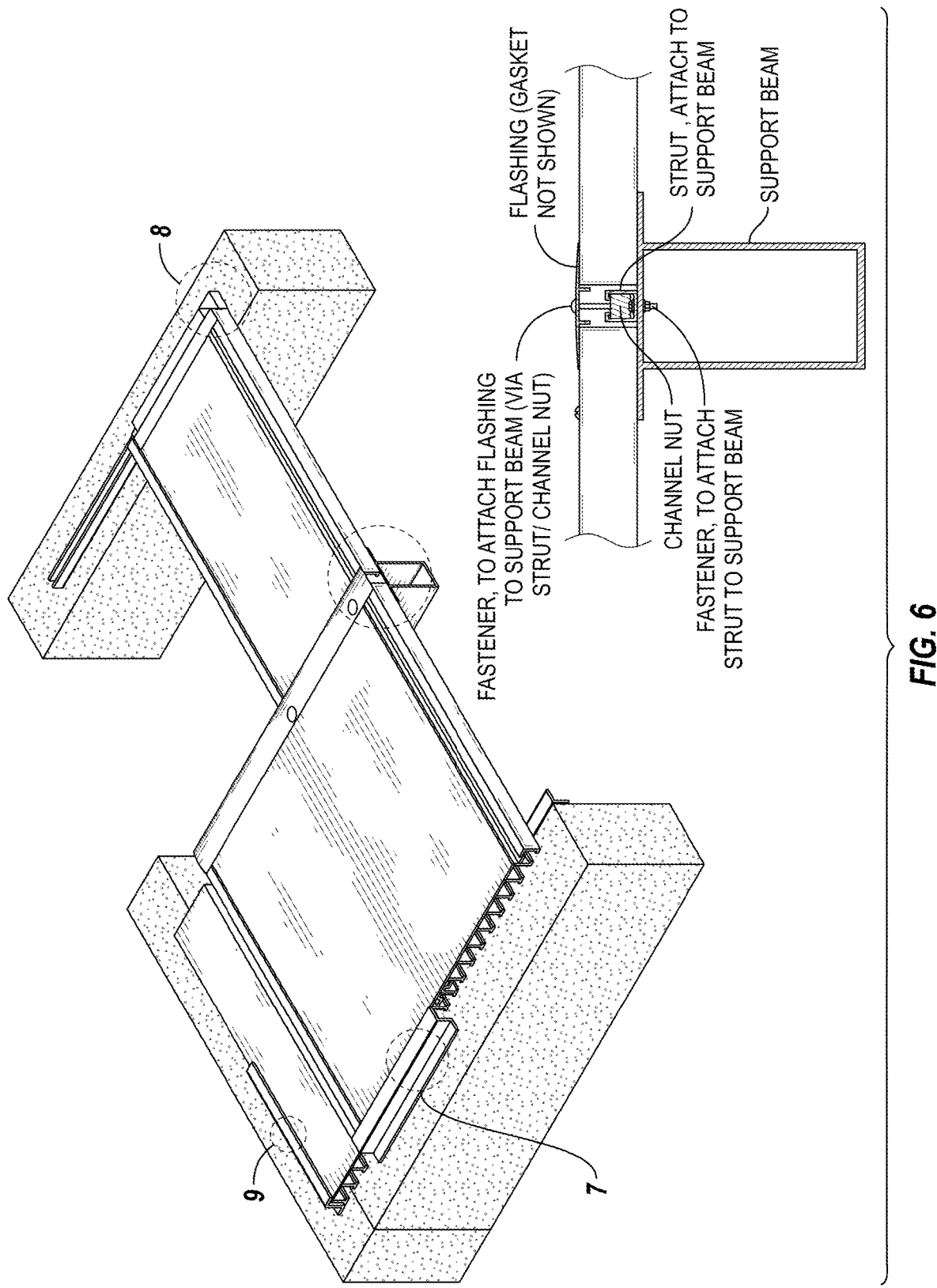
FIG. 6 depicts an embodiment of panel connections at support beam on the load bearing end of panel of this application showing a tapered connection to enhance safety and reduce tripping hazards unlike prior art in FIG. 5.
Figure 7:
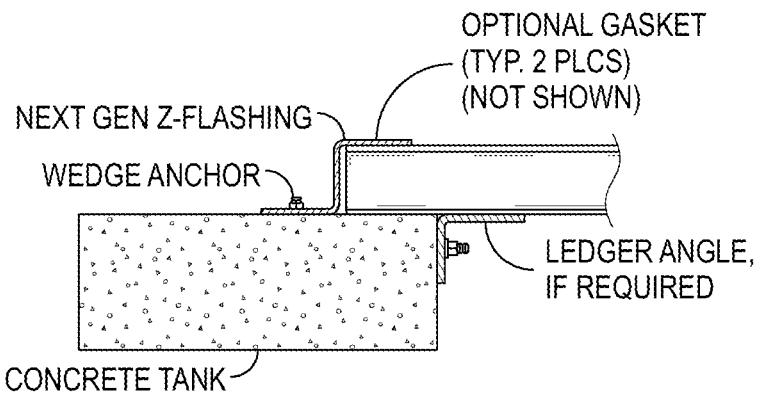
FIG. 7 depicts an embodiment of panel connections at concrete tank on the load bearing end of panel.
Figure 8:
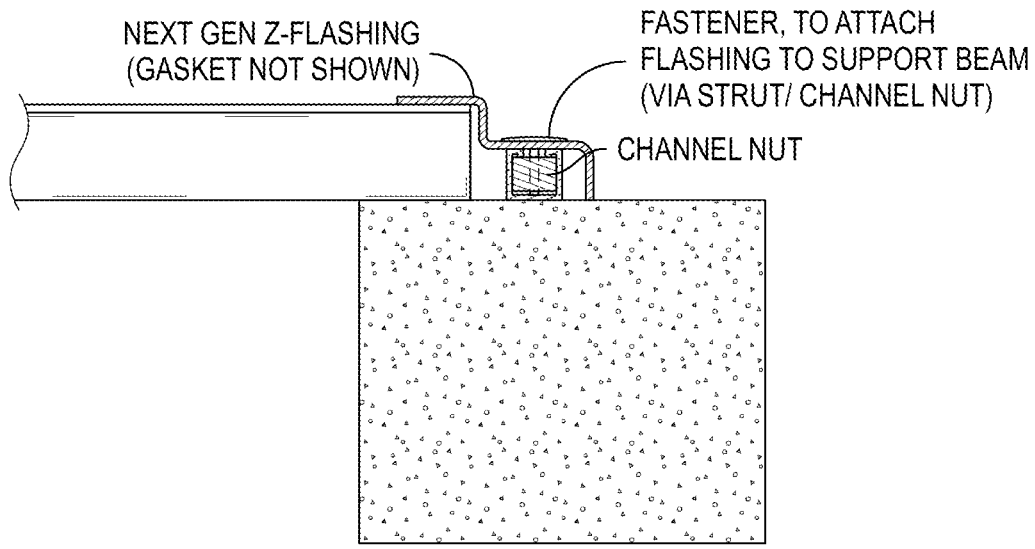
FIG. 8 depicts an embodiment of panel connections on concrete perimeter on the load bearing end of panel.
Figure 9:
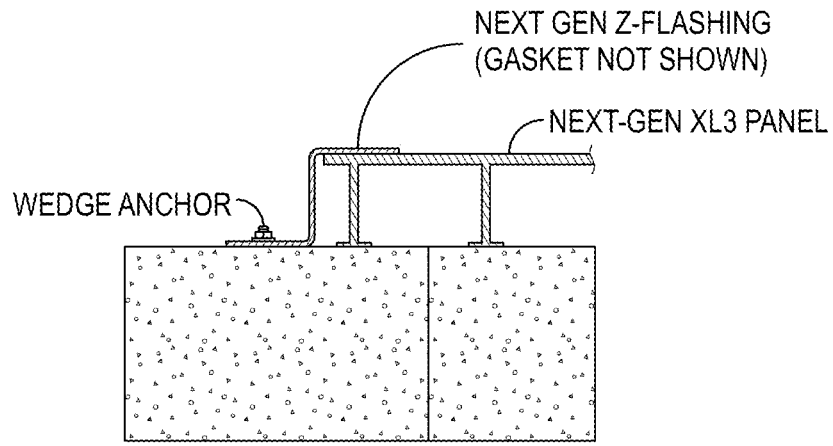
FIG. 9 depicts an embodiment of panel connections at concrete tank on the non-load bearing; ripped panel.
Figure 10:
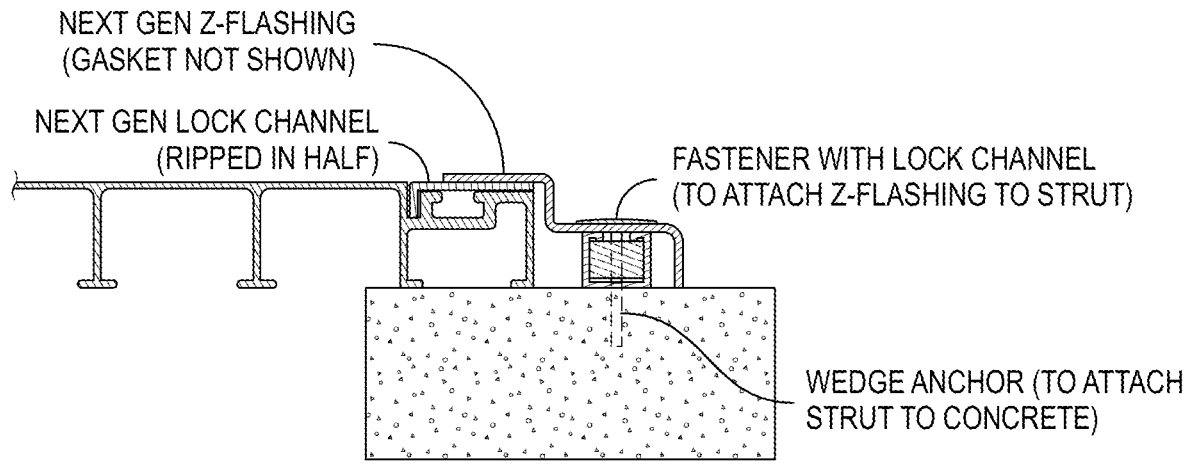
FIG. 10 depicts an embodiment of panel connections at concrete tank on the non-load bearing end of panel where panel installation starts at tank wall.
Figure 11:
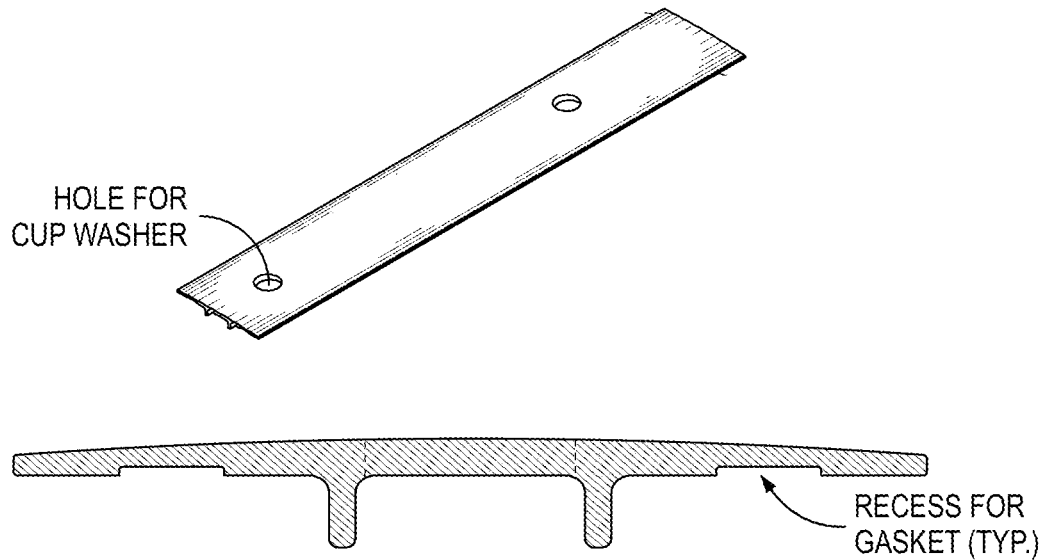
FIG. 11 depicts a call-out of the flashing of FIG. 6 showing exemplary details of gasket placement and flashing.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In general, the application pertains to fiberglass wastewater tank covers with uses including but not limited to odor control, water protection, process protection, ultraviolet screen and algae barrier, splash control, freeze and thermal barrier, volatile organic compounds emission control, and improved aesthetics. Without limitation, benefits of the invention include corrosion resistant, high strength, removable panels, easy installation, long term operator access, high strength fiber reinforced plastic, life cycle cost savings, compression sealed, long maintenance-free life, elevate safety of tank cover working environments, and is customizable. Advantageously, it is designed to be more conducive for long term, repeatable removal and reinstallation without damage to the structural material engaged to that may also decrease compression gasketing to contain odors. Prior art utilizes a fastener connection which over time experiences damage (enlargement, misshaping) to the fiberglass reinforced plastic (FRP) material providing structural engagement security. The new design accommodates repeated access (removal and installation).

The tank cover components do not corrode in chemical exposures and wet conditions associated with water and wastewater treatment operations. A pultrusion process may be used for manufacturing and may be configured to produce high content of reinforcing fibers (up to 65% by weight) and strength for long span capability and high load conditions. The tank cover may be custom designed and configured to accommodate most tanks with different shapes, including but not limited to rectangular or round, and different sizes, including but not limited to small or large. The tank cover may take into account one or more parameters for construction, the one or more parameters including cost budget, material selection, system design, specifications, and/or any combination thereof. The tank cover comprises a fiberglass reinforced plastic cover.

The tank cover may comprise one or more panels configured to be removable over an extended period of time without sacrificing structural integrity to the deck and beams or gasket compression for odor control even after repeated use. In some examples, the panel may weigh from about 7 to about 15 pounds per lineal foot or in some embodiments about eleven pounds per lineal foot and are lightweight, and easy to handle. The panel dimensions are not particularly critical and may vary depending upon desired characteristics and other features of the system. In some examples, the panel may include a height of from about 2 to about 4 such as 3 about inches, and a width of from about 28 to about 36 such as about 32 inches. Removing sections only requires backing out one or more bolts from one or more permanent lock nuts (the bolt and nut may be the DURO-CAM™ LOCK brand as one example). Removal of the bolts and locking channels allows for easy removal of single panels. The panels may comprise non-skid high-strength structural panels configured, for example, for worker foot traffic. Any number of the panels may include a gritted surface. In this manner, the high-strength, pultruded panels may enable the cover to be used as a safe, working surface for operators. The flat, gritted surface protects slippage of the operator and/or maintenance personnel. Moreover, the substantially flat, tapered connectors reduces the likelihood of tripping hazards for operators and/or maintenance personnel. The tank cover fiber reinforced plastic components are lighter, easier to handle, and field fabricate than alternative materials. For example, minimal fasteners are required to attach the panels and locking channel. That is the present design may reduce fastener usage by at least 10%, or at least 30%, or at least 30%, up to about 40%, or up to about 50% over prior art systems. In some examples, installation of flashings and support beams may be similar to that of installation of flashing and roof beams in construction.

The tank cover may comprise one or more access hatches. In some examples, an access hatch may be dimensioned or configured to fit within individual thirty inches wide panel sections.

The tank cover may be sealed with one or more gaskets strategically placed to minimize air leakage unlike the prior art systems which do not generally minimize air leakage. For example, the tank cover may be sealed with one or more synthetic materials, including but not limited to ethylene propylene diene monomer gaskets, and may be configured to be resistant to weather conditions, aging, and odor. The tank cover may be sealed with an appropriate gasket, such as ethylene propylene diene monomer gaskets or a material of similar durometer or compressability at panel joints, end conditions, and at access hatches. In this manner, the tank cover may be configured to effectively contain odors and gases associated with one or more treatment processes.

FIG. 1 depicts an illustration of panel-to-panel connection according to an exemplary embodiment. First configuration 102 illustrates connections between the lock channel 110 and panels 106, 114. First configuration 102 includes a set of fasteners 108, 116 each disposed at opposite ends to attach the lock channel 110 to the panels 106, 114. The lock channel 110 may span the length of the panels 106, 114. Second configuration 104 illustrates a view of a connection between the lock channel 110 and panels 106, 114. Different ends of the lock channel 110 may be coupled to respective recessed portions of different panels 106, 114 via different fasteners 108, 116. The cover assembly system may include a panel 106, a fastener 108, a lock channel 110, and a nut 112. The fastener 108 may be configured to attach the lock channel 110 to the panel 106. The nut 112 may comprise a channel nut that is configured to receive the fastener 108 so as to secure the lock channel 110 to the panel 106. The lock channel 110 may be dimensioned as four inches wide by one inch height or greater to allow for improved deck panel layout sizing and scalability from one system to another. The lock channel 110 may be configured to fit into a recessed portion of the panel 106. For example, one portion of the lock channel 110 may secured by one fastener 108 to attach to the panel 106, and a second portion of the lock channel 110 may be secured by a second fastener 116 to the second or connecting panel 114, each with respective channel nuts 112, 118. In this manner, the recessed portions of the panel 106 where the lock channel 110 fits ensures a smooth or flat surface on top of the panels 106, 114 and without any gaps on each side between the lock channel 110 and the panels 106, 114. Each fastener 108, 116 may be disposed in respective recessed portions of the panels 106, 114 and the recessed portions may include each of the respective channel nuts 112, 118. Although FIG. 1 illustrates single instances of components of the system, the cover assembly system may include any number of components.

FIG. 2 depicts an illustration of panel connections at a support beam according to an exemplary embodiment. Configuration 202 connections between the lock channel 110 and panels 106, 114 (as shown above in FIG. 1), and flashing 206 and panel 205 and support beam 208. The flashing 206 may be coupled to the panel 205 at a middle portion of the flashing 206, and the middle portion of the flashing 206 may be coupled to the support beam 208 at a middle portion of the support beam 206 via one or more fasteners 204. The fastener 204 may be configured to attach a flashing 206 to a support beam 208 via strut 214 and channel nut 210. The fastener 204 may be disposed between one or more panels 205. The channel nut 210 may be configured to receive the fastener 204 to attach the strut 214 to the panel 205. The strut 214 may further be attached to the support beam 208 via the fastener 212. The channel nut 210 may be configured to be disposed between the one or more panels 205. The strut 214 may be configured to be attached to the support beam 208, and may be disposed between the one or more panels 205. The flashing 206 may comprise a plurality of portions each disposed between and adjacent to opposing ends of the one or more panels 205. For example, the fastener 212 may be configured to attach the strut 214 to a middle portion of the support beam 208. The fastener 204 may be configured to attach the flashing 206 to the support beam 208 via strut 214 at a middle portion of the flashing 206. Although FIG. 2 illustrates single instances of components of the system, the cover assembly system may include any number of components. FIG. 2 may reference the same or similar components as illustrated in FIG. 1.

FRP Tank Cover Systems

The FRP tank cover systems are engineered for the specific needs and requirements that are common for wastewater and water treatment operations. The FRP tank cover systems are designed to give long-term service, each tank cover system is built upon 35 years of global leadership in research, development and production of FRP composites. All the tank covers are constructed with high-strength, pultruded FRP components, totally corrosion resistant, and designed for quick installation by local contractors.

To address a broad range of process, size and functional requirements, Applicant offers three tank cover systems, each with specific benefits and advantages. Applications for the tank covers include odor control, volatile organic compound (VOC) emission control, splash control, freeze/thermal barrier, ultraviolet (UV) screen/algae barrier, water protection, process protection, and improved aesthetics.

Tank Cover System Types

The tank cover system types include a XL3™ tank cover system, a XL6™ tank cover system, and a Tuff Span™ tank cover system.

Figure 12:
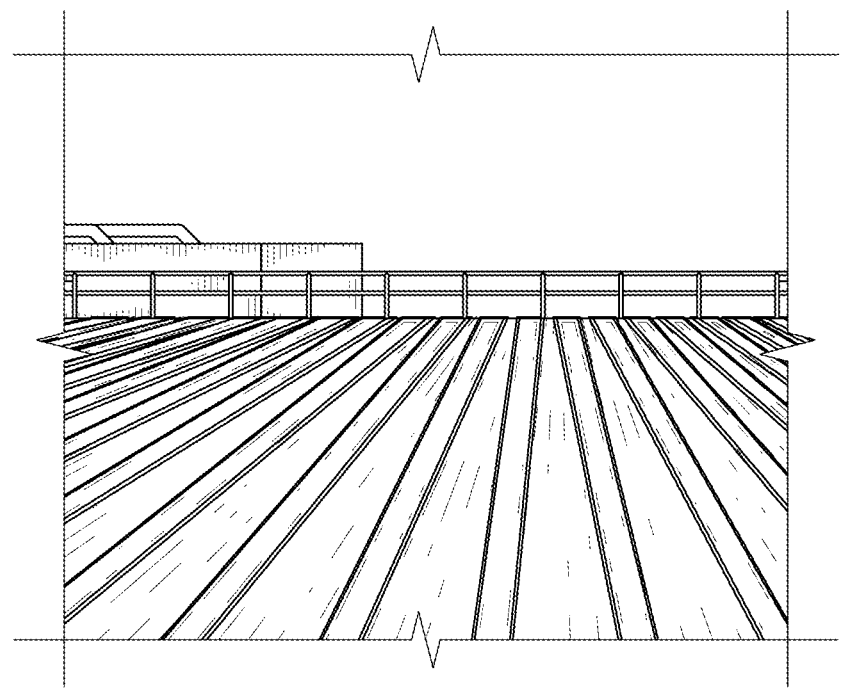
FIG. 12 depicts a XL3™ tank cover system.

FIG. 12 depicts a XL3™ tank cover system. Advantages for the XL3™ tank cover system include odor and vapor control, easy to remove and install, size versatility, access hatches, and safe for foot traffic. The XL3™ tank cover system offers appealing qualities but with lighter panels and easier removability.

Figure 13:
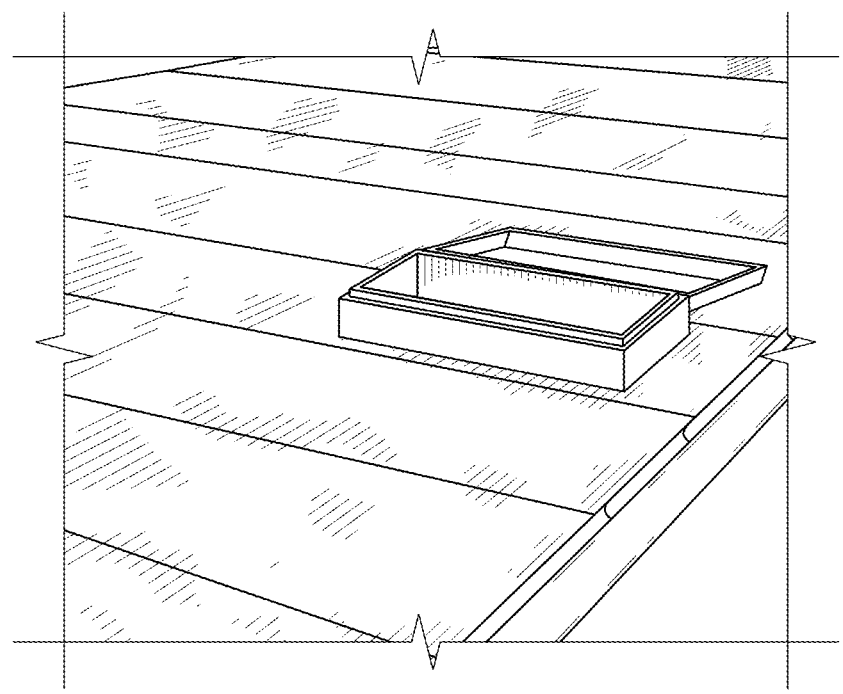
FIG. 13 depicts a XL6™ tank cover system.
Figure 14:
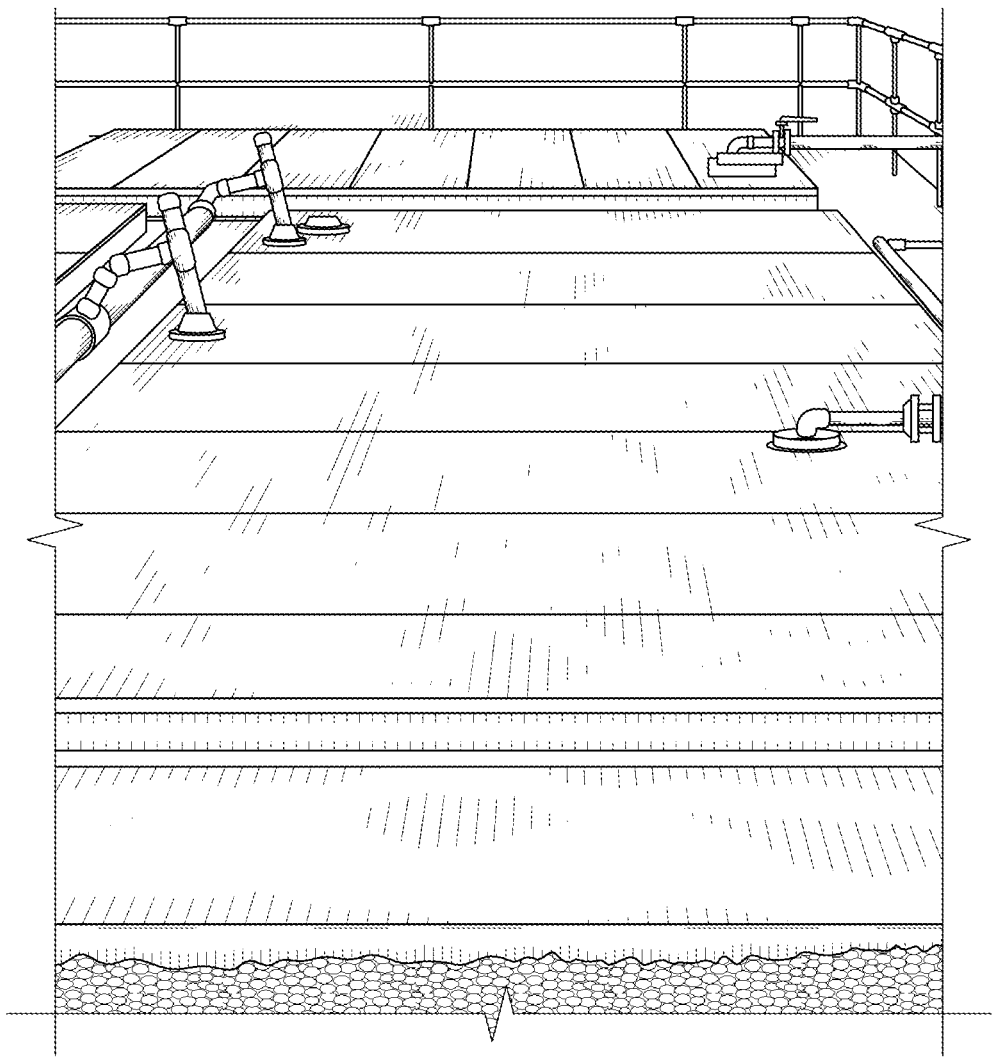
FIG. 14 depicts a XL6™ clear span tank cover system with access hatches, aeration basins.

FIG. 13 depicts a XL6™ tank cover system. Advantages for the XL6™ tank cover system include odor control, gasketed for tight seal, easy to remove and install, self-contained hatches, long span capability, and safe for foot traffic. The XL6™ tank cover system is designed for large basins, the XL6™ tank cover system is an excellent low-profile cover system for odor control, accessibility, and service life. FIG. 14 depicts a XL6™ clear span tank cover system with access hatches, aeration basins.

FIG. 15 depicts a Tuff Span™ tank cover system. Advantages for the Tuff Span™ tank cover system include walk-in access option, easy to install, translucent panel option, and walkable cover option. For walk-in access or as a UV and debris barrier, the Tuff Span™ tank cover system offers a cost effective, corrosion resistant, structural enclosure.

Representative Benefits of Well-designed FRP (1) Corrosion resistant: manufactured with premium, isopolyester and vinyl ester resin systems, the FRP tank cover system offer superior protection against corrosive elements present in water and wastewater treatment operations as compared to aluminum.

(2) High strength: to ensure high strength and consistent quality, the FRP structural components of the FRP tank cover system are manufactured by automated pultrusion process, which utilizes high glass-fiber content and results in unparalleled product consistency.

(3) Lightweight: the favorable strength-to-weight properties of the FRP tank cover system contributes directly to reduced loads on tank walls and floors and to the ease of cover removability and installation.

(4) UV protection: exterior coatings and stabilizers within the material provide UV protection for the FRP components and ensure long service life.

(5) Cost savings: the combination of corrosion resistance, high strength, and UV protection offered by well-designed FRP delivers longer service life, less maintenance, and life cost savings as compared to other materials.

Representative System Design (i) Turn key solutions: the tank cover component panels are fabricated with penetration openings and angle cuts as well as integral hatch framing and flashing to eliminate field fabrication and make installation quick and easy. Solutions include all necessary accessories, including hatches, gooseneck vents, nozzles, flashings and hardware.

(ii) Customized system: with multiple cover systems and configurations, Applicant customizes the design to meet project-specific load requirements including personnel, uplift, dead and snow loads.

(iii) Low-profile: with less air volume to process, Applicant's low profile covers reduce operating cost and size of scrubber units compared to domes. Flat covers also improve aesthetic impact on communities, eliminate confined-entry issues, and provide protection for equipment located on top of the cover instead of below.

Typical Representative Configurations

FIG. 16 depicts typical configurations of FRP span tank cover system, wherein (a) depicts a configuration of flat and clear span; (b) depicts a configuration of flat and beam-supported; (c) depicts a configuration of flat and truss-supported; and (d) depicts a configuration of walk-in and enclosures.

Channels and smaller tanks may be clear spanned using our XL6™ panels (up to 20 feet) and XL3™ panels with the configuration of flat and clear span. Medium-sized tanks or tanks which allow column supports may be spanned utilizing a combination of beams and decking panels with the configuration of flat and beam-supported. For spans above 50 feet, a truss-supported systems which utilize either the XL6™ panels or Tuff Span™ panels is used with the configuration of flat and truss-supported. Raised configurations or FRP buildings may be designed for applications which require walk-in access or additional vertical space above the water surface with the configuration of walk-in and enclosures.

XL3™ Tank Cover System

System Overview

Figure 17:
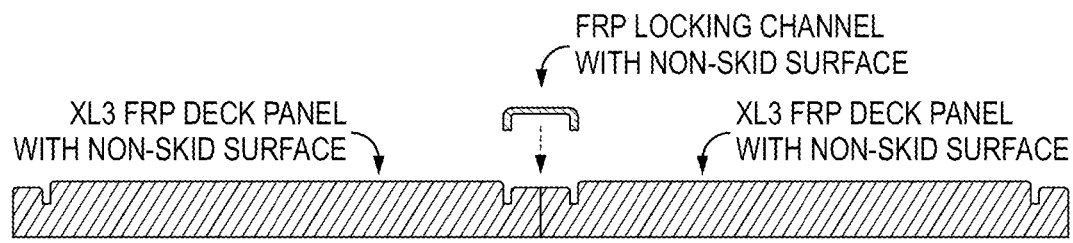
FIG. 17 depicts a cross-sectional view of the XL3™ tank cover system.
Figure 18:
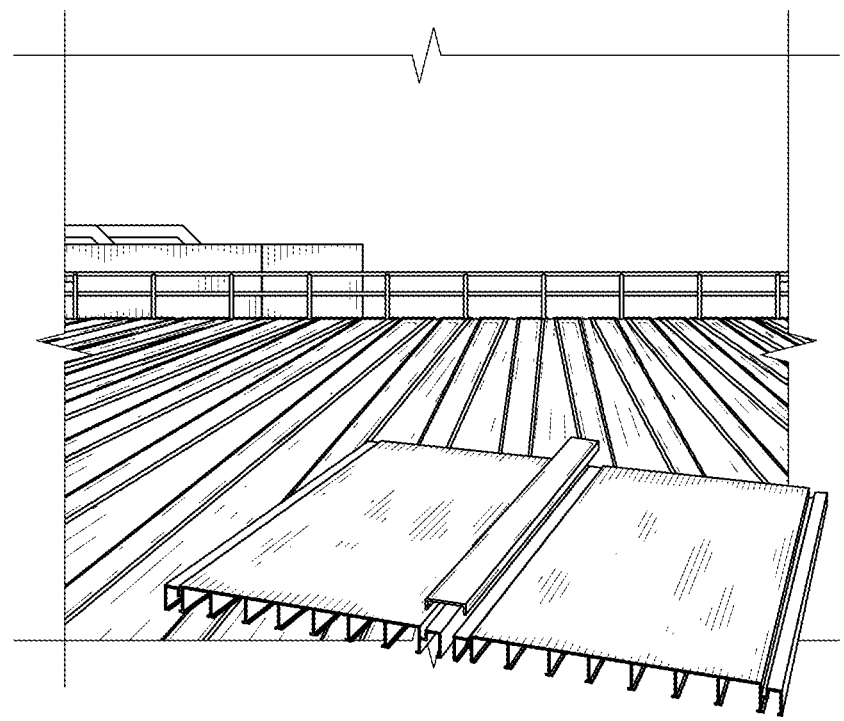
FIG. 18 depicts an example of the XL3™ tank cover system.

FIG. 17 depicts a cross-sectional view of the XL3™ tank cover system. FIG. 18 depicts an example of the XL3™ tank cover system. The XL3™ TankCover from Enduro Composites is one of the most advanced cover systems The XL3™ FRP cover offers appealing qualities for users and operators plus has lighter and easier to remove panels. FIGS. 16 (*a*) and (*b*) show configurations of the XL3™ tank cover system.

Key XL3™ Features and Benefits (1) Odor & Vapor Control: sealed with EPDM gaskets at panel joints, end conditions, and at access hatches, the XL3™ Cover System effectively contains odors and gases associated with treatment processes. Tested air leakage is 0.17 CFM/SF at −0.20 INWG.

(2) Size Versatility: XL3™ Tank Covers are custom designed to accommodate most any size tank, either round or rectangular, large or small. Applicant may assist design engineers with cost budgets, appropriate material selection, system design, and specifications. For water and wastewater treatment operations, Applicant offers FRP: Tank Covers, Baffle Walls, Weirs and Scum Baffles, Density Current Baffles, Launder Covers, and Building Structures.

(3) Easy Access & Removability: Weighing 11 lbs per lineal foot, XL3™ panels are lightweight and easy to handle. Removing sections only involves backing out threaded fasteners . . . . After removing fasteners and locking channel, single panels may be removed easily. Access hatches may be sized to fit within individual 30" wide, XL3™ panel sections.

(4) Easy, Low-cost Installation: XL3™ deck panels and FRP support beams are typically lighter, easier to handle, and field fabricate than alternative materials. Minimal fasteners are required to attach panels and locking channel. Installation of flashings and support beams is similar to installing flashing and roof beams in typical construction.

Table 1 shows maximum allowable spans, lineal feet. Allowable spans are the lesser span controlled by: 1) deflection limit, L/D, or 2) Factor of Safety of 2.0 minimum for maximum allowable load. Allowable spans for concentrated loads also consider maximum deflection of ⅝". IBC 2015, Section 1607 requires minimum concentrated load loading of 250 lbs. distributed over 2.5'×2.5' area to determine spans for "All roof surfaces subject to maintenance workers".

*Concentrated Load: 250 lb. load distributed over 2.5'× 2.5' area at mid-span of cover panel with deflection not to exceed ⅝" or L/180.

*Each cover panel shall be removable vertically without having to remove adjacent panels or cutting of components.

*Air leakage rate shall not exceed 0.17 CFM/SF at negative pressure of 0.2 inches of water column for a 5 minute duration per testing conducted by a certified agency.

(2) Products
  i) Manufacturers: Standard for design and performance may be XL3™ Tank Cover System.
  ii) Materials: FRP structural components including decking and structural supports may be manufactured by pultrusion process. Color of components may be any desired including, for example, charcoal gray.
    A) Glass fiber reinforcements may be minimum of 50% of the material weight.
    B) Materials may be fire retardant with flame spread rating of 25 or less per ASTM E84 test.
    C) Materials may exhibit these Physical Properties (min):

| | |
|---|---|
| Tensile Strength (ASTM D638) | 30,000 psi |
| Compressive Strength (ASTM D695) | 30,000 psi |
| Flexural Strength (ASTM D790) | 30,000 psi. |

D) XL3™ Tank Cover Deck Panels.
      i) FRP deck panels shall have minimum thickness of 3/16".
      ii) Resin type for FRP tank cover decking may be Isophthalic Polyester or Vinyl Ester.

TABLE 1

| Uniform Positive Load, PSF | | 20 | | 30 | | 40 | | 50 | | 60 | |
|---|---|---|---|---|---|---|---|---|---|---|---|
| Span Type | | 1 | 2 | 1 | 2 | 1 | 2 | 1 | 2 | 1 | 2 |
| L/D | 120 | 14.2 | 18.9 | 12.4 | 16.4 | 11.3 | 13.4 | 10.9 | 12.0 | 9.8 | 10.9 |
| | 180 | 12.4 | 16.7 | 10.8 | 14.5 | 9.8 | 13.2 | 9.1 | 12.0 | 8.6 | 10.9 |
| | 240 | 11.3 | 15.1 | 9.8 | 13.2 | 8.9 | 12.0 | 8.3 | 11.1 | 7.8 | 10.5 |
| Concentrated Load, Lbs | | 250 | | 300 | | 400 | | 500 | | | |
| Span Type | | 1 | 2 | 1 | 2 | 1 | 2 | 1 | 2 | | |
| L/D | 180 | 13.1 | 14.6 | 12.3 | 13.7 | 11.2 | 12.5 | 10.4 | 11.6 | | |
| | 240 | 13.1 | 14.6 | 12.2 | 13.7 | 10.6 | 12.5 | 9.5 | 11.2 | | |

(Specifications: Fiberglass Reinforced Plastic Tank Cover)
(1) General
(i) Description of Work
  Scope of this specification may include materials for fiberglass reinforced plastic (FRP) tank covers, which may include, but not limited to deck panels; structural supports; flashing; fasteners and anchors; gaskets and sealant.
(ii) Design Criteria
  a) Design Loads may comply with local codes with combined loads determined by Allowable Stress Method.
    *Dead+Live or Snow Load:_____psf
    *Wind Uplift Load:_____psf
    *Concentrated Load:_____psf
  b) Design Limits
    *Dead+Live or Snow Load: Deflection Limit=L/180; Factor of Safety=2.0.
    *Wind Uplift less Dead Load: Deflection Limit=L/60; Factor of Safety=1.88.

iii) Top of the tank cover decking shall be flat with factory applied, non-skid, UV resistant surface, gray or beige color.
    E) FRP Structural Framing (if required).
      i) Resin type for FRP beams shall be vinyl ester.
      ii) Metal angles or plates attached to FRP beams or connections shall be 316SS.
    F) Hatches (if required)
      i) Access hatches may be sized as indicated on drawings.
      ii) Hatches may have a hold-open device to prevent door from blowing open or closing on itself.
      iii) Hatch lids may have plastic or stainless steel lift handles.
      iv) View port hatches may be 12 inches square or less.
    G) Flashing and Trim may be FRP or 316SS.
    H) Hardware:
      i) Fasteners, anchors, hinges, and other accessories located on underside of cover shall be 316SS.
      ii) Perimeter flashing fasteners, concrete anchors, or other hardware not exposed to inside of tank may be 304SS.

iii) Fasteners to attach tank cover decking shall be 316SS and have gasket seal washers.

I) Gaskets and Sealants i) Gaskets may be installed at end joints of deck panels and below flashing to seal perimeter and seams.

ii) Sealant may be applied by Contractor at various locations as required.

XL6™ Tank Cover System

System Overview

Figure 19:
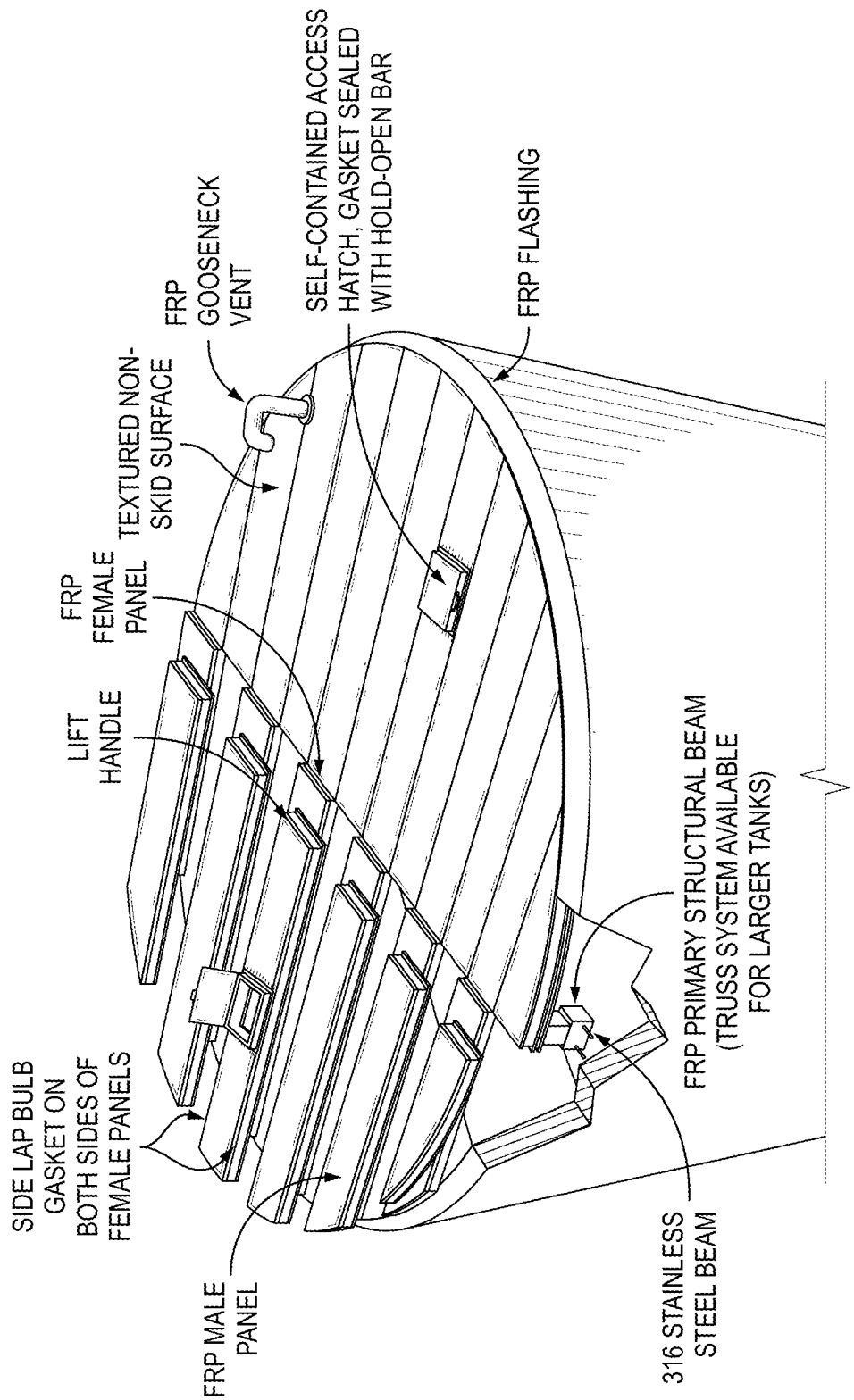
FIG. 19 depicts a system components of the XL6™ tank cover system.

FIG. 19 depicts a system components of the XL6™ tank cover system. The features and benefits of the XL6™ tank cover system may be numerous and include effective odor control, easy-to-remove sections, long-span deck panels offering foot traffic safety, plus low profile advantage. The XL6™ flexible design is suitable for large rectangular or round basins and may be top-mounted on or flush with tank walls. FIG. 16 (a), (b), and (c) show configurations of the XL6™ tank cover system.

Key XL6™ Features and Benefits

Figure 20A:
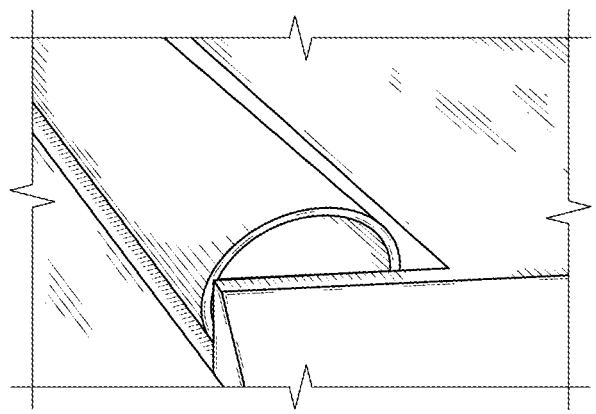
FIG. 20A depicts gaskets at outdoor edges and panel joints control odors.
Figure 20B:
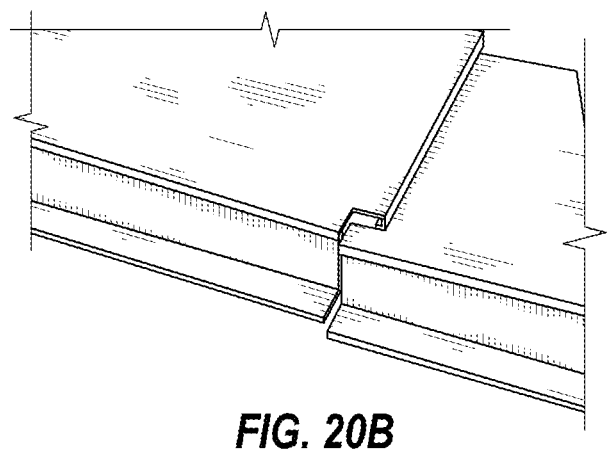
FIG. 20B depicts interesting XL6™ panels are easy to remove and lift vertically.
Figure 20C:
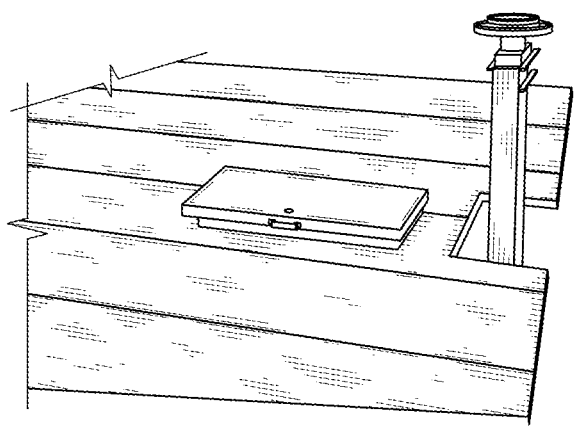
FIG. 20C depicts shop-fabricated panels include notched openings and self-contained access hatches.

FIG. 20 (a) depicts gaskets at outdoor edges and panel joints control odors; FIG. 20 (b) depicts interesting XL6™ panels may be easy to remove and lift vertically; and FIG. 20 (c) depicts shop-fabricated panels include notched openings and self-contained access hatches.

(1) Odor Control: XL6™ cover systems may be effectively sealed with gaskets located at all outer edges, panel side laps and access hatches.

(2) Complete Removability and Accessibility: able to be handled by two workers without lifting equipment, each XL6™ male panel may be removed individually after removing only four nuts, and each XL6™ female panel may be freely lifted after removing its two adjacent male panels. In addition, XL6™ access hatches may be self-contained within one panel, allowing panel removal without affecting adjacent panels.

(3) Long Span Capability: the XL6™ system clears spans up to 20'. For longer span requirements, FRP beams and columns or steel truss members are utilized to support XL6™ deck panels.

(4) Easy, Low-cost Installation: factory-fabricated deck panels are simply laid in place and require only half of the cover panels to be fastened to supports.

Figure 21:
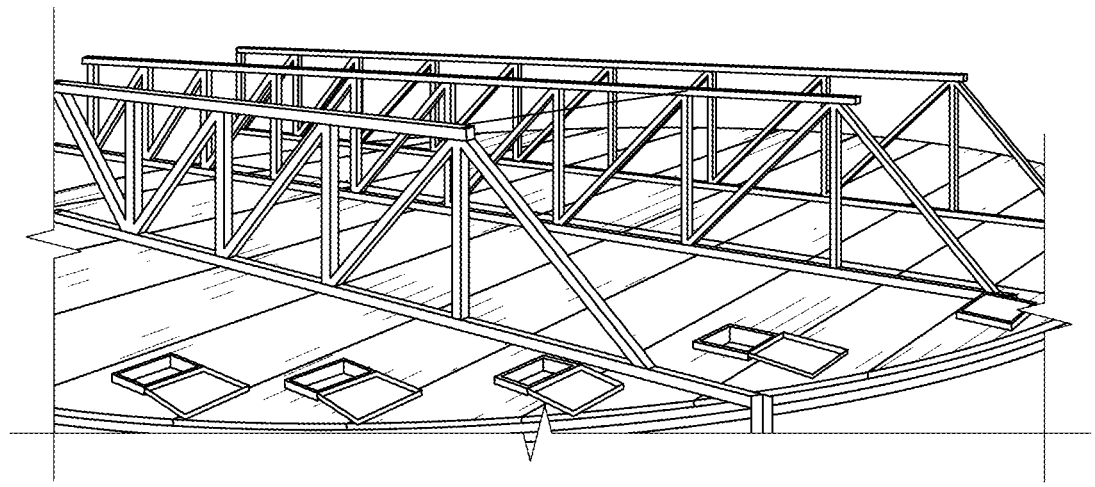
FIG. 21 depicts XL6™ truss-supported tank cover system with FRP access hatches and safety grating 88' diameter gravity thickener.
Figure 22A:
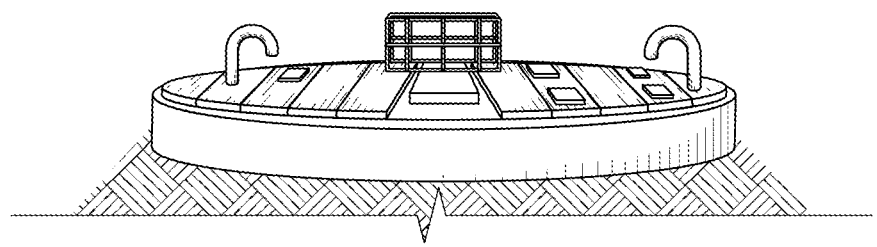
FIG. 22A depicts XL6™ clear span tank cover with access hatches and vents 40' diameter sludge thickener cover.
Figure 22B:
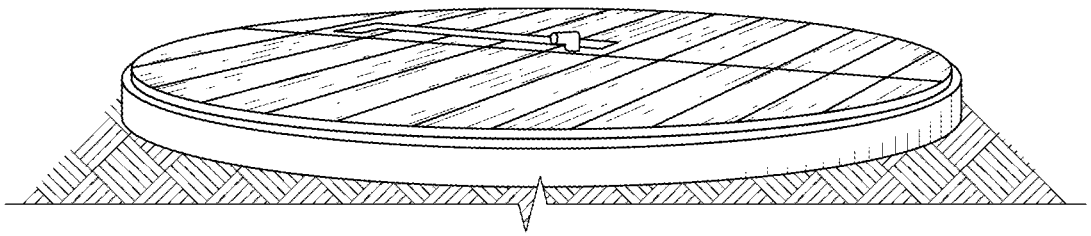
FIG. 22B depicts XL6™ beam-supported tank cover system 50' diameter clarifiers.
Figure 23:
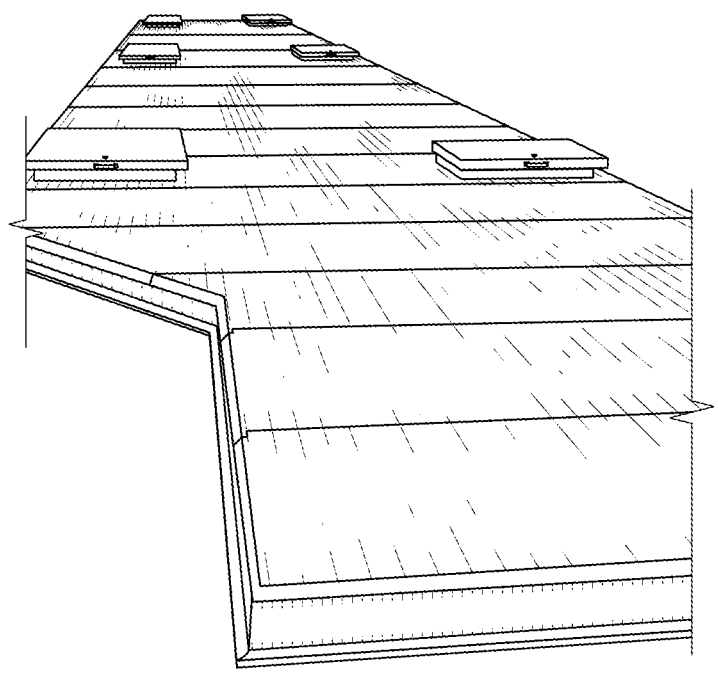
FIG. 23 depicts XL6™ clear span tank cover system with angle cut panels and access hatches over filtrate storage tanks.
Figure 24:
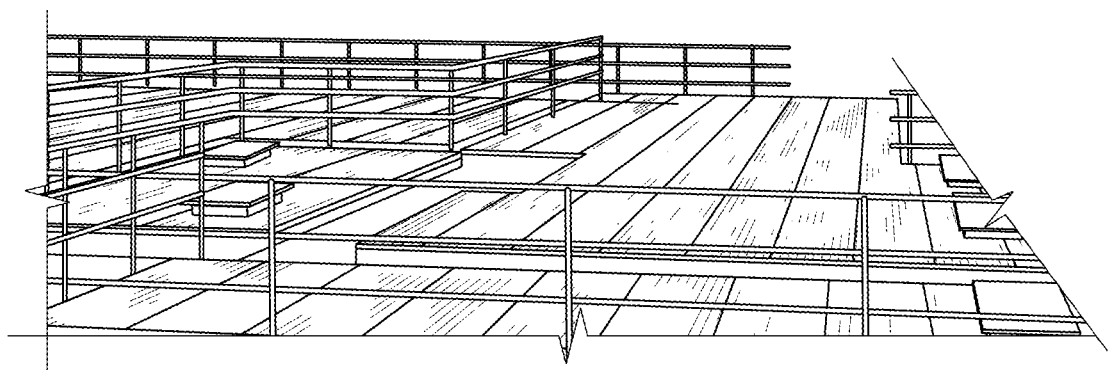
FIG. 24 depicts XL6™ clear span tank cover with access hatches UV disinfection process.
Figure 25A:
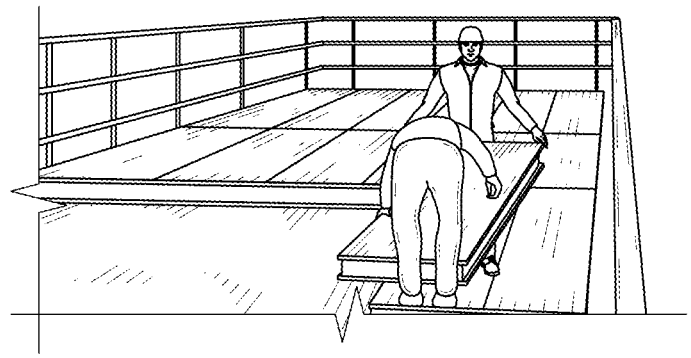
FIG. 25A depicts XL6™ beam-supported cover-DAF cells. Cover panels may be handled by two workers alone.
Figure 25B:
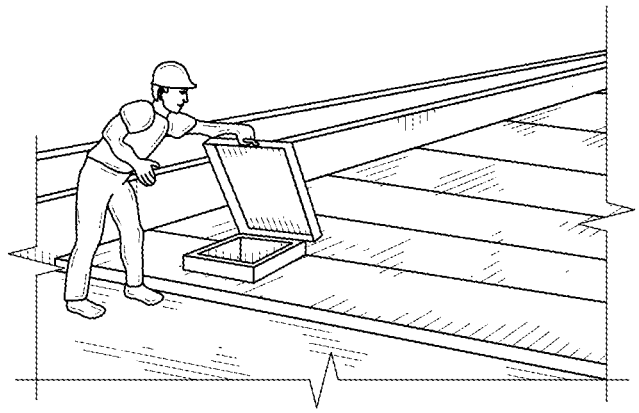
FIG. 25B depicts XL6™ clear span cover. Chemical treatment tank self-contained hatches permit easy panel removal.
Figure 25C:
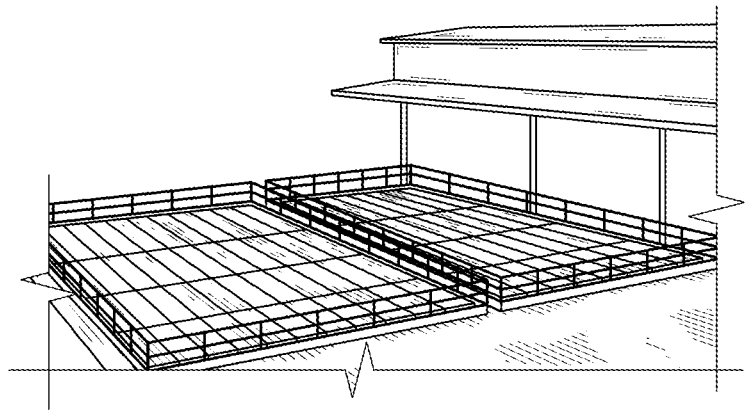
FIG. 25C depicts XL6™ beam supported cover with access hatches 53'×60' pre-treatment tank complex.

Applications of the XL6™ tank cover system include headworks and grit covers, clarifiers, aeration and equalization, sedimentation, sludge and gravity thickeners, chlorine contact basins, filtrate storage tanks, and chemical process tanks. FIG. 21 depicts XL6™ truss-supported tank cover system with FRP access hatches and safety grating 88' diameter gravity thickener. FIG. 22 (a) depicts XL6™ clear span tank cover with access hatches and vents 40' diameter sludge thickener cover; and FIG. 22 (b) depicts XL6™ beam-supported tank cover system 50' diameter clarifiers. FIG. 23 depicts XL6™ clear span tank cover system with angle cut panels and access hatches over filtrate storage tanks. FIG. 24 depicts XL6™ clear span tank cover with access hatches UV disinfection process. FIG. 25 (a) depicts XL6™ beam-supported cover-DAF cells. Cover panels may be handled by two workers alone; FIG. 25 (b) depicts XL6™ clear span cover. Chemical treatment tank self-contained hatches permit easy panel removal; and FIG. 25 (c) depicts XL6™ beam supported cover with access hatches 53'×60' pre-treatment tank complex.

Table 2 shows load span table.

TABLE 2

Maximum Allowable Load - Safety Factor = 2.5

| Span | Uniform Live or Snow | | Concentrated Load* |
|---|---|---|---|
| | L/D = 120 | L/D = 180 | L/D = 180 |
| 20 ft. | 32 psf | 26 psf | 778 lbs. |
| 18 ft. | 39 psf | 36 psf | 887 lbs. |
| 16 ft. | 50 psf | 50 psf | 998 lbs. |
| 14 ft. | 65 psf | 65 psf | 1141 lbs. |
| 12 ft. | 89 psf | 89 psf | 1331 lbs. |

Concentrated load distributed over 1' × 2' area

Figure 26:
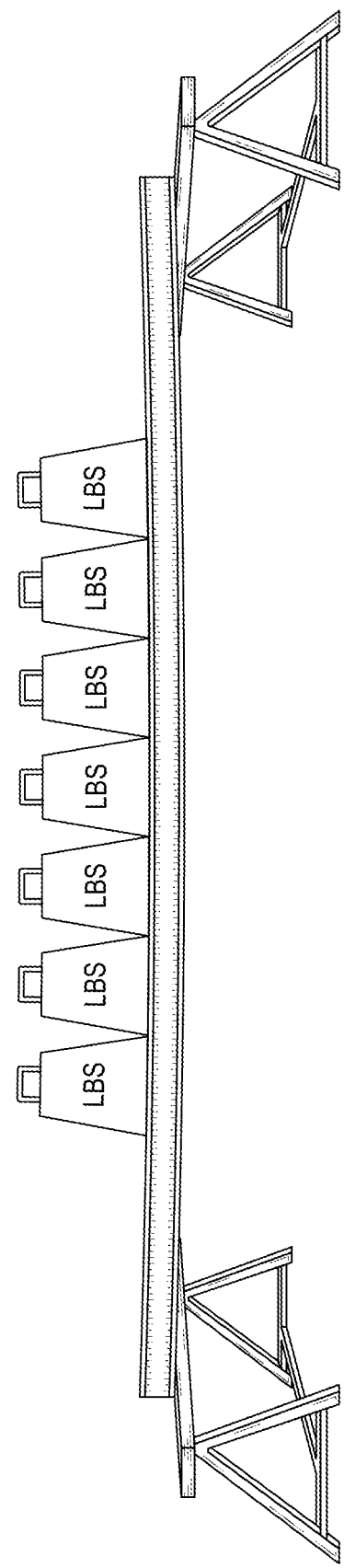
FIG. 26 depicts XL6™ strength demonstration.
Figure 27A:
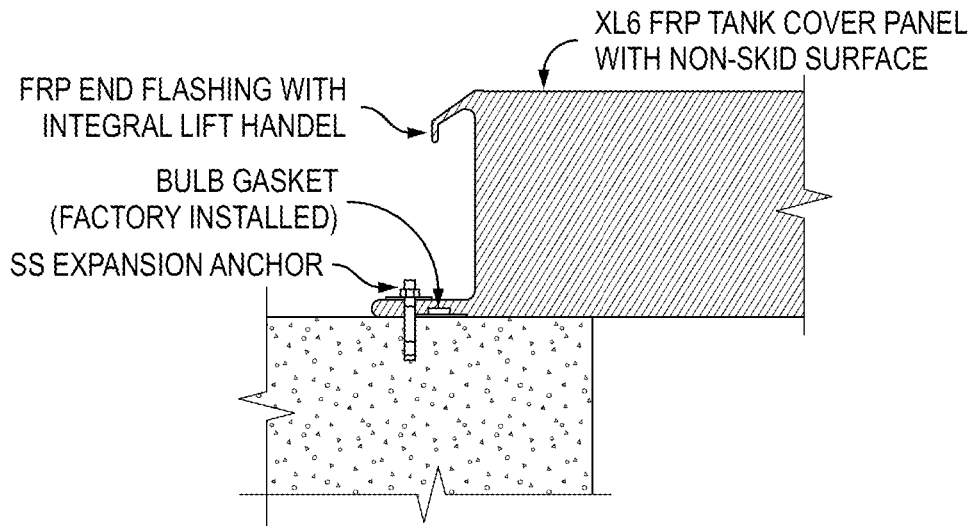
FIGS. 27A-27C depicts typical details of XL6™ tank cover system, wherein FIG. 27A concrete wall.
Figure 27B:
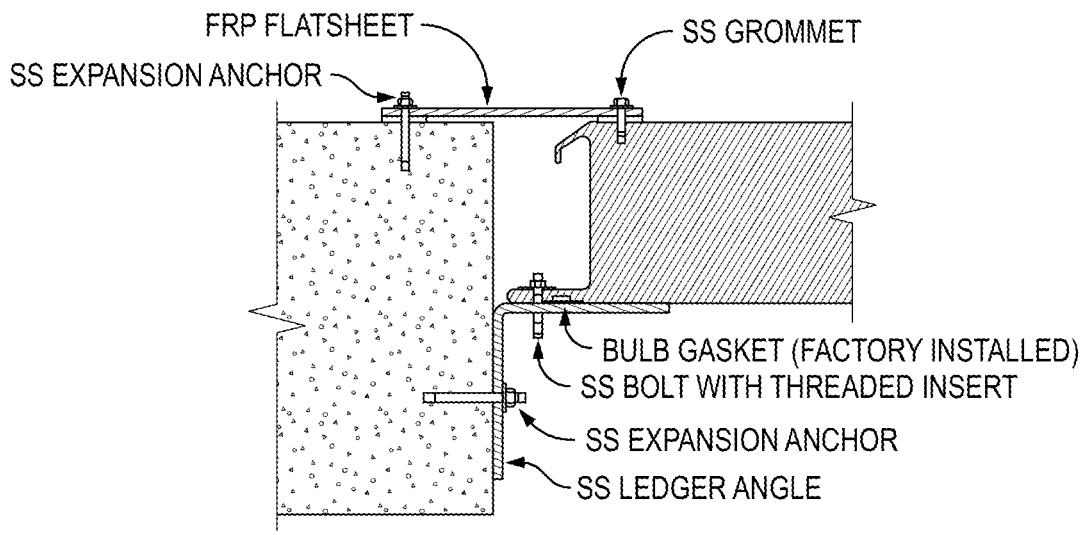
Figure 27C:
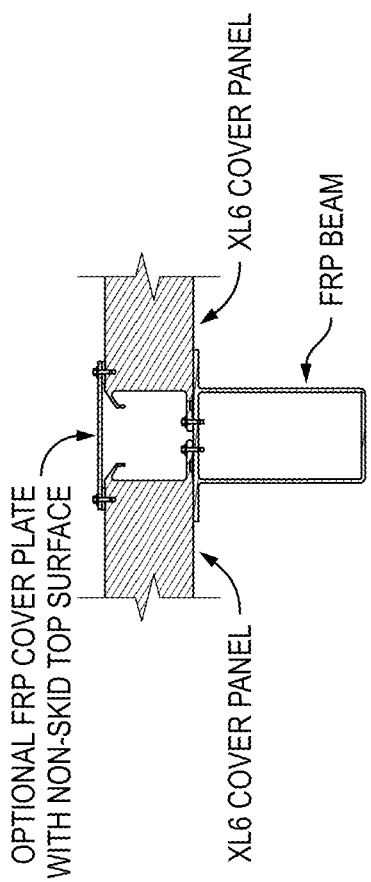
Figure 28:
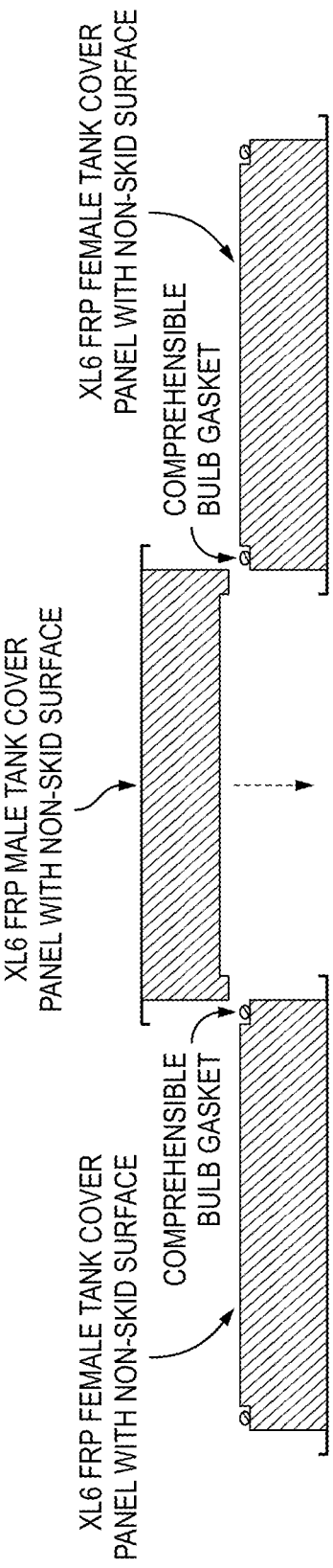
FIG. 28 depicts a XL6™ tank cover system, wherein FIG. 28A steel bridge.
Figure 28A:
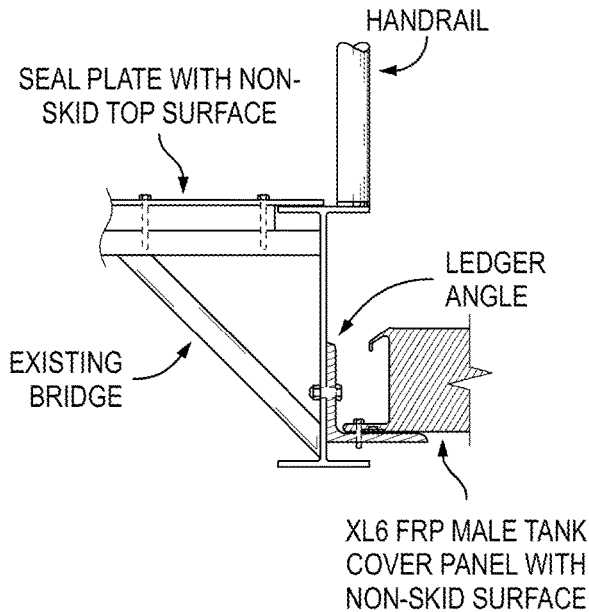
FIG. 28B beam-supported.
FIG. 28C hatch.
Figure 28B:
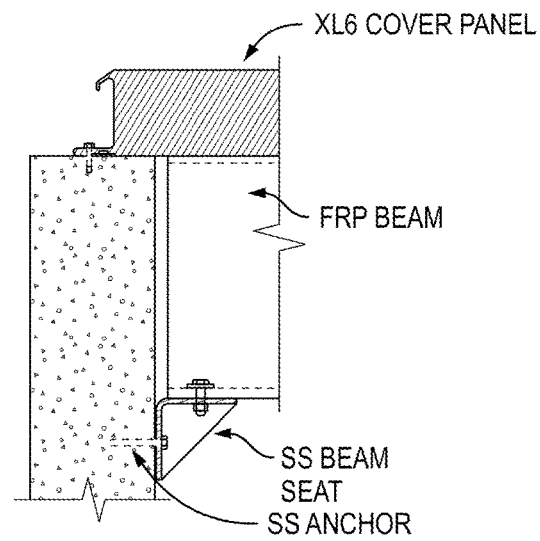
Figure 28C:
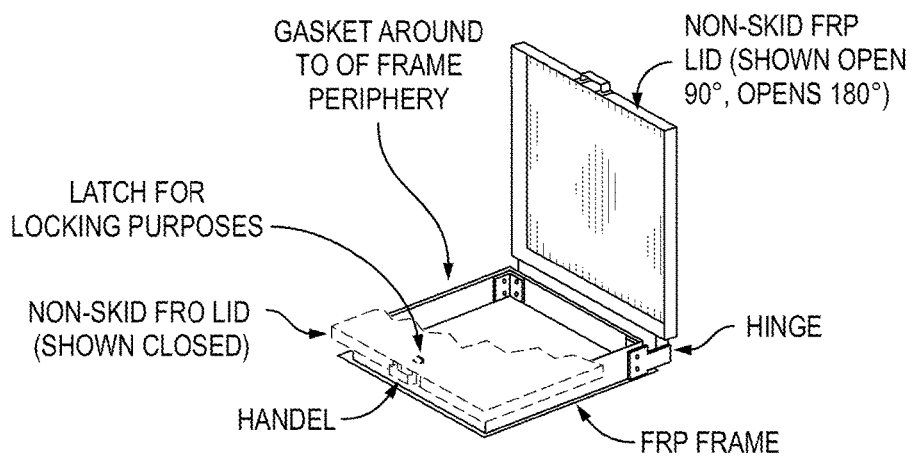

FIG. 26 depicts XL6™ strength demonstration. Under a uniform load of 30 psf, deflection on a 20' span may be L/180. FIG. 27 depicts typical details of XL6™ tank cover system, (a) concrete wall; (b) flush concrete wall; and (c) end to end. FIG. 28 depicts a XL6™ tank cover system, wherein (a) steel bridge; (b) beam-supported; and (c) hatch. (Specifications of XL6™ Tank Cover System)

(1) General (i) Description of Work

The scope of this specification may include fiberglass reinforced plastic (FRP) flat tank covers which may consist of tank cover deck panels; structural supports; flashing and trim; fasteners and anchors; gaskets and sealant.

(ii) Design Criteria a) Design Loads.

*Live or Snow:_____psf

*Wind Uplift:_____psf

*Dead Load:_____psf b) Design Limits

1) Dead+Live or Snow Load: Limit=L/120; Factor of Safety=2.5.

2) Wind Uplift less Dead Load: Deflection Limit=L/60; Factor of Safety=1.88.

3) Personnel Load: Cover panels may have ½" maximum deflection under 250 lb. concentrated load over 2.5 SF area located at mid-point of 20' clear span.

c) Air leakage: Air leakage shall not exceed 1 CFM/LF at gasketed panel joints and 2.2 CFM/LF at cover perimeter under −0.5 inch water pressure per HVAC Air Duct Leakage Test in accordance with NEBB "Procedural Standards for Adjusting, Balancing, of Environmental Systems".

d) Cover Panel Removability

1) Each cover panel may be removable without having to remove no more than its two adjacent panels. Note: Each XL6™ male panel may be removed individually.

2) Each cover panel may be removable vertically and without cutting of a cover component.

(2) Products i) Manufacturers: The standard for design, characteristics, and performance may be XL6™ Cover System.

ii) Materials.

A) Fiberglass reinforced plastic (FRP) structural components including decking, beams, and framing may be manufactured by pultrusion process.

1) Glass fiber reinforcements may be minimum of 50% of the material weight.

2) Materials may be fire retardant with flame spread rating of 25 or less per ASTM E84.

3) Materials may exhibit these Physical Properties (minimum):

| Tensile Strength | 40,000 psi | ASTM D 638 |
| Compressive Strength | 37,000 psi | ASTM D 695 |
| Flexural Strength | 45,000 psi | ASTM D 790 |
| Flexural Modulus | 1,690,000 psi | ASTM D 790 |
| Izod Impact (Notched) | 25 | ASTM D 256 |
| Water Absorption | .25% max | ASTM D 570 |

B) XL6™ Tank Cover Panels.

1) Resin type for FRP tank cover decking may be UV stabilized, isophthalic polyester.

2) Deck panels may be sealed at side-laps with factory installed, non-adhesive, 1" diameter neoprene bulb gasket.

3) Each deck panel may have vertical lifting handles that may be integral, located at each end, and flush with top of panel.

4) Top of tank cover decking may be flat and have a nonskid, UV resistant surface.

5) Color of deck panels may be standard gray or beige (u.n.o).

C) Hatches (if required).

1) Hatches may be raised with one-leaf hatch door and fabricated from pultruded fiberglass components.

2) Access hatches may be sized to fit inside a single deck panel so a panel with hatch may be removed without affecting adjacent panels.

3) Underside of hatch lid may be sealed with factory installed, ⅜" diameter neoprene bulb gasket. Perimeter hatch curb may be sealed to decking surface with sealant.

4) (Optional): Hatches may have a stainless steel, hold-open device to prevent door from blowing open or closing on itself.

5) Hatches may be secured with hand-operable latches and without special tools.

6) Hatch lids may have a non-skid, UV resistant surface with plastic or stainless steel lift handles.

7) View port hatches may be 12 inches square or less.

D) FRP Structural Framing (if required)

Resin type for FRP beams and framing members may be UV stabilized, vinyl ester.

E) Trusses (if required)

1) Trusses may be galvanized steel except where components may be exposed to inside of tank. Components exposed to inside of tank may be Stainless Steel (as suitable for the environment.

2) Trusses may have minimum 6'6" clearance from top of tank cover to bottom of top chord.

3) Trusses may be shipped in lengths up to 20' (as feasible) to be bolted together by contractor.

F) Flashing and Trim

1) Fiberglass flashing may be isophthalic polyester.

2) Non-radius, end flashing may be factory attached to deck panels.

3) Flashing with a radius or at perimeter of circular tank may be a separate part and field attached by the contractor.

G) Air Vents and Connections (if required)

1) Gooseneck ventilation piping may be FRP with plastic bird screen.

2) Stub-vent connections may be FRP with blind flange extending 6 inches (min) from top of tank cover.

H) Pipe Penetrations

1) Existing or new pipe penetrations may be retrofitted by Contractor to penetrate cover at a 90-degree angle.

2) Pipe penetrations may be flashed in the field with a steatite retrofit, zipper type, pipe flashing or equal.

I) Hardware:

1) Fasteners, anchors, hinges, and other structural accessories located on the underside of cover may be 304/316 Stainless Steel.

2) Perimeter flashing anchors, concrete anchors, or other hardware not exposed to the inside environment of tank may be 304 Stainless Steel.

J) Gaskets and Sealants

1) All panel side laps and perimeter conditions may be gasketed.

2) Sikaflex®-1A sealant may be applied by Contractor at various locations as required for odor containment.

Tuff Span™ Tank Cover System and Enclosures

System Overview

Figure 29:
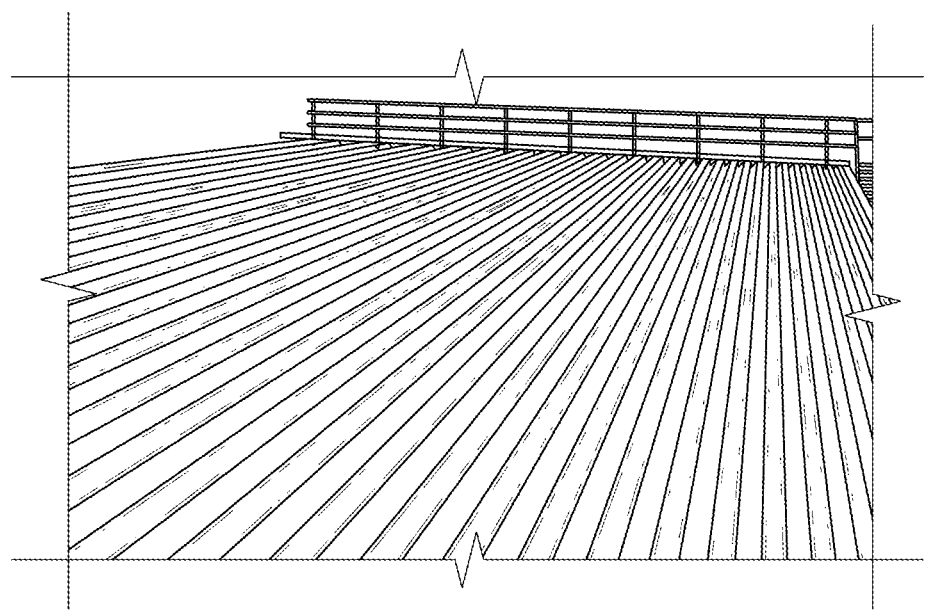
FIG. 29 depicts Tuff Span™ low-profile tank cover system with FRP beams, UV disinfection process.

FIG. 29 depicts Tuff Span™ low-profile tank cover system with FRP beams, UV disinfection process. Constructed with Tuff Span™ FRP building panels and FRP structural components, Tuff Span™ tank covers provide versatile configurations including low-profile, roof-type covers or raised, building-type covers. The Tuff Span™ low-profile covers may be installed over storage and process tanks for UV screens and debris protection. Tuff Span™ raised covers and enclosures may provide walk-in access to processes. Tuff Span™ cover components may include Tuff Span™ FRP building panels, FRP beams, access hatches and stainless steel hardware. FIGS. 16 (b), (c) and (d) show configurations of the Tuff Span™ tank cover system.

(Key Tuff Span™ System Features and Benefits)

Figure 30:
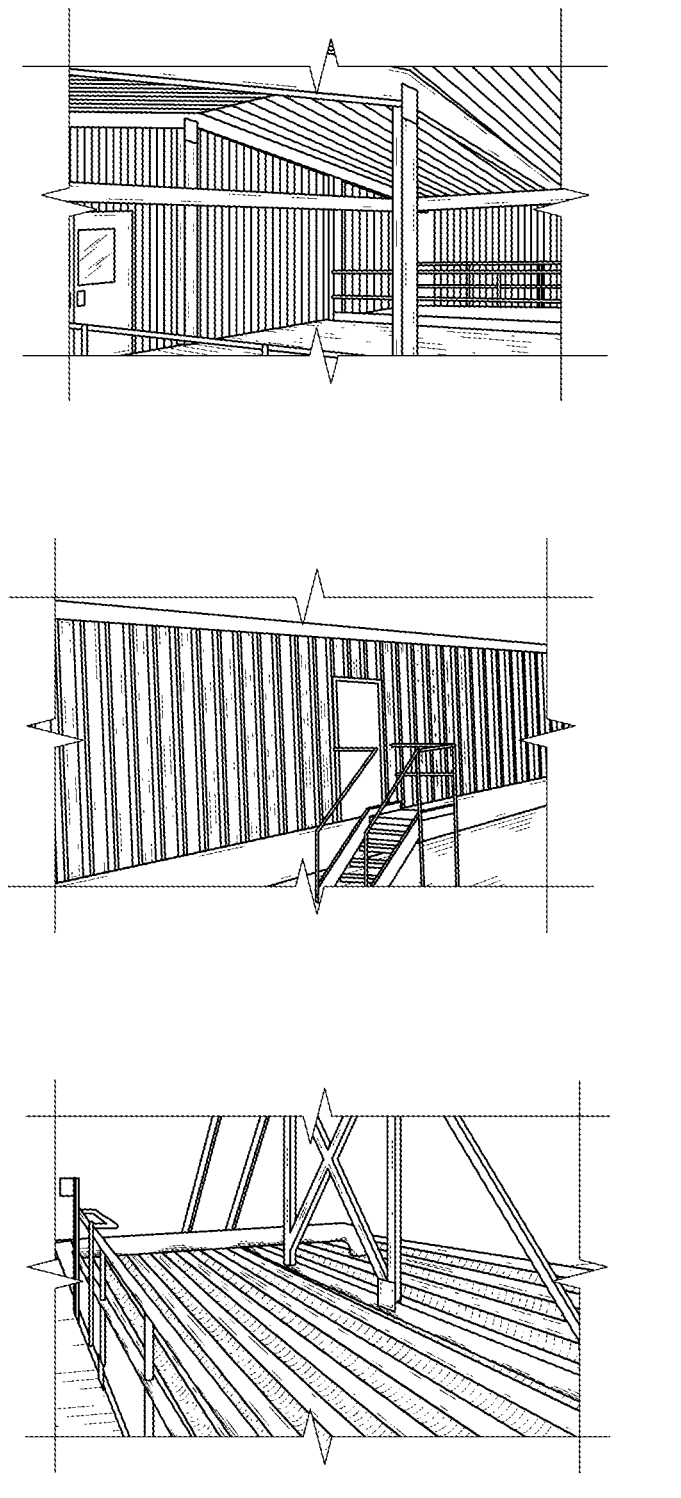
FIG. 30 depicts Tuff Span™ system, wherein (b) depicts Tuff Span™ walk-in cover with FRP beams 15 year old installation; and (c) depicts Tuff Span™ truss-supported cover.

FIG. 30 depicts Tuff Span™ system, wherein (b) depicts Tuff Span™ walk-in cover with FRP beams 15 year old installation; and (c) depicts Tuff Span™ truss-supported cover.

(i) Walk-in Access Option: for maximum process viewing, Tuff Span™ walk-in covers may offer an ideal solution.

(ii) Translucent or Opaque Cover Panels: Tuff Span™ Cover panels may be furnished in opaque color or translucent, which transmit natural lighting and may reduce energy bills.

(iii) Easy to Install: complete solution may include delivering pre-cut structural members and finished panel lengths for easy installation.

Figure 31:
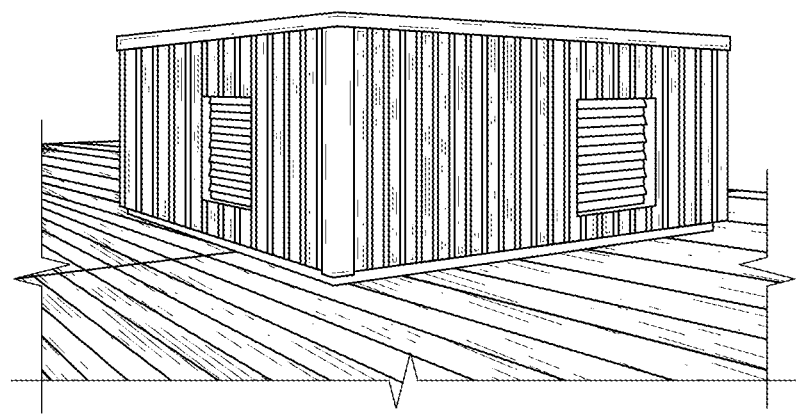
FIG. 31 depicts Tuff Span™ removable enclosure with FRP panels, beams and fouvers over floating aerator. Beam-supported cover-aeration basin.
Figure 32A:
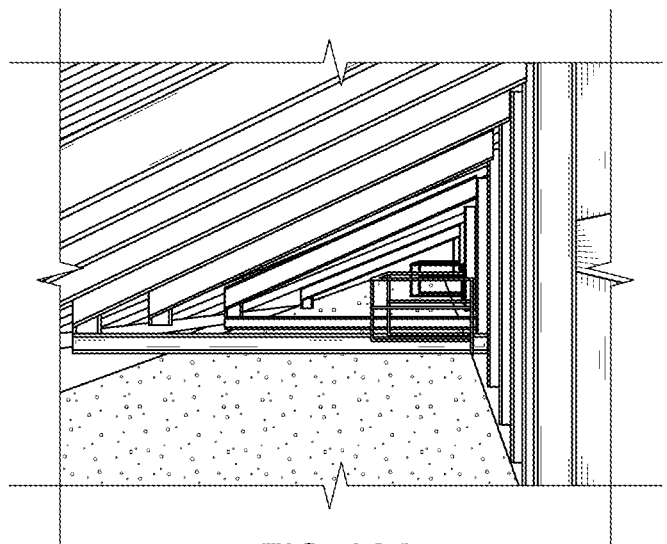
FIG. 32A depicts inside of the Tuff Span™ walk-in tank cover system with FRP translucent panels, beams, platforms and doors, aeration basin.
Figure 32B:
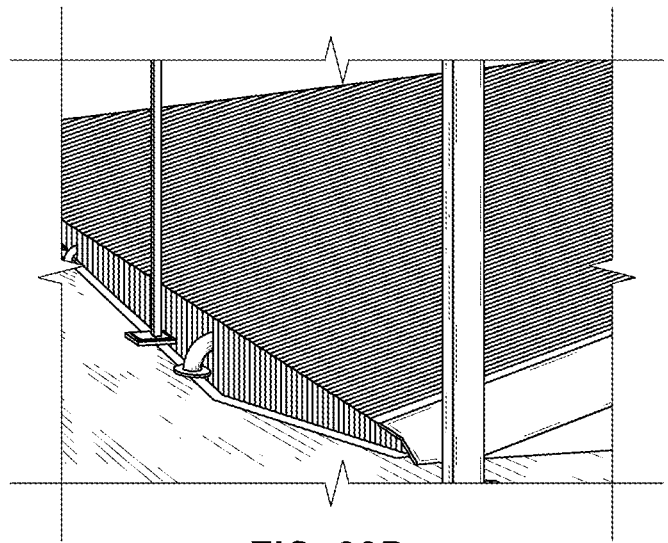
FIG. 32B depicts outside of the Tuff Span™ walk-in tank cover system with FRP translucent panels, beams, platforms and doors, aeration basin.
Figure 33:
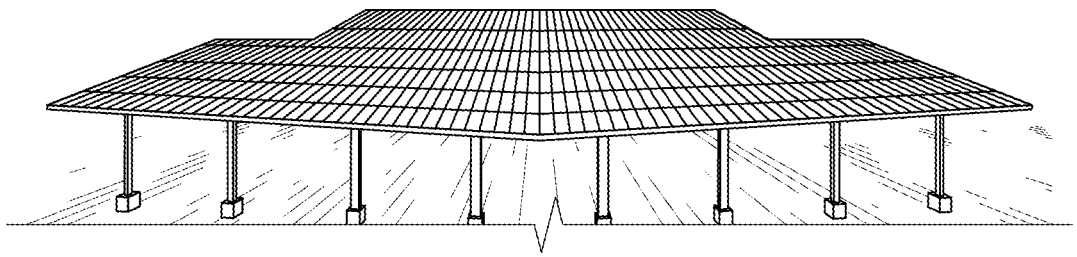
FIG. 33 depicts Tuff Span™ roof cover system, sludge drying bed.

(iv) Custom Design & Specifications: with full line of Tuff Span™ FRP structural building panels and shapes, Applicant may assist with developing customized solutions for a broad range of conditions Applications of the Tuff Span™ tank cover system may include UV screens, sludge drying beds, water storage, chlorine contact basins, filtrate storage tanks, and chemical process tanks. FIG. 31 depicts Tuff Span™ removable enclosure with FRP panels, beams and fouvers over floating aerator. Beam-supported cover-aeration basin. FIG. 32 (a) depicts inside of the Tuff Span™ walk-in tank cover system with FRP translucent panels, beams, platforms and doors, aeration basin; and FIG. 32 (b) depicts outside of the Tuff Span™ walk-in tank cover system with FRP translucent panels, beams, platforms and doors, aeration basin. FIG. 33 depicts Tuff Span™ roof cover system, sludge drying bed.

Tuff Span™ FRP Structural Components

Long recognized as leading FRP structural materials, Tuff Span™ building panels and beams may be used as primary components in Tuff Span™ tank covers and walk-in enclosures.

The innovative structural shapes may also use as framing components in the XL6™ and XL3™ covers plus baffle wall. Utilizing cavity shapes for increased stability, lateral bracing needs for these beams may be eliminated. The sections have winged-flanges for easy-access, fastening locations.

Figure 34:
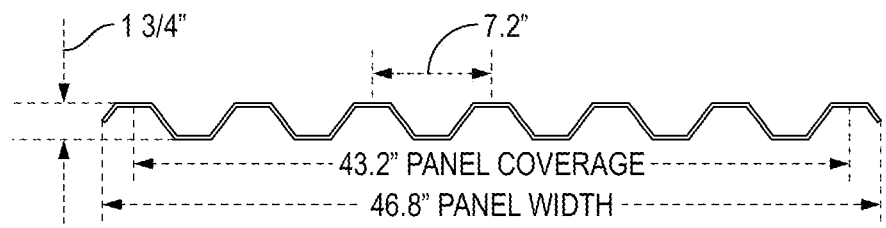
FIG. 34 depicts a shape of Tuff Span™ panel, 7.2D×1.75 FR 450.
Figure 35:
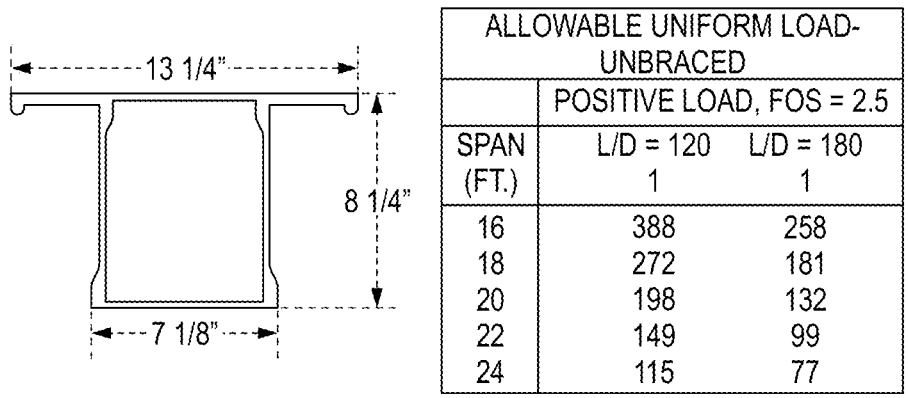
FIG. 35 depicts a shape of Tuff Span™ panel, 8F6.
Figure 36:
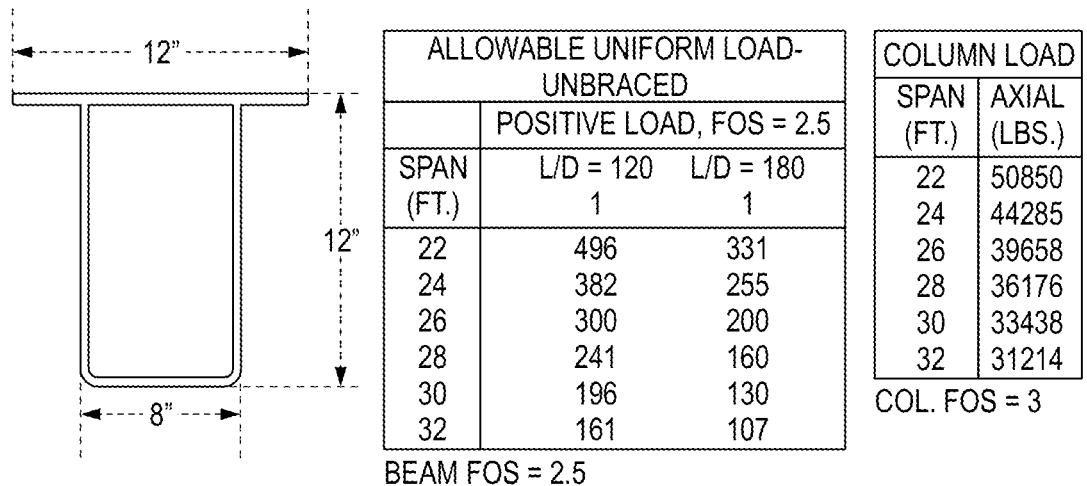
FIG. 36 depicts a shape of Tuff Span™ panel, 12F12 flanged tube.
Figure 37:
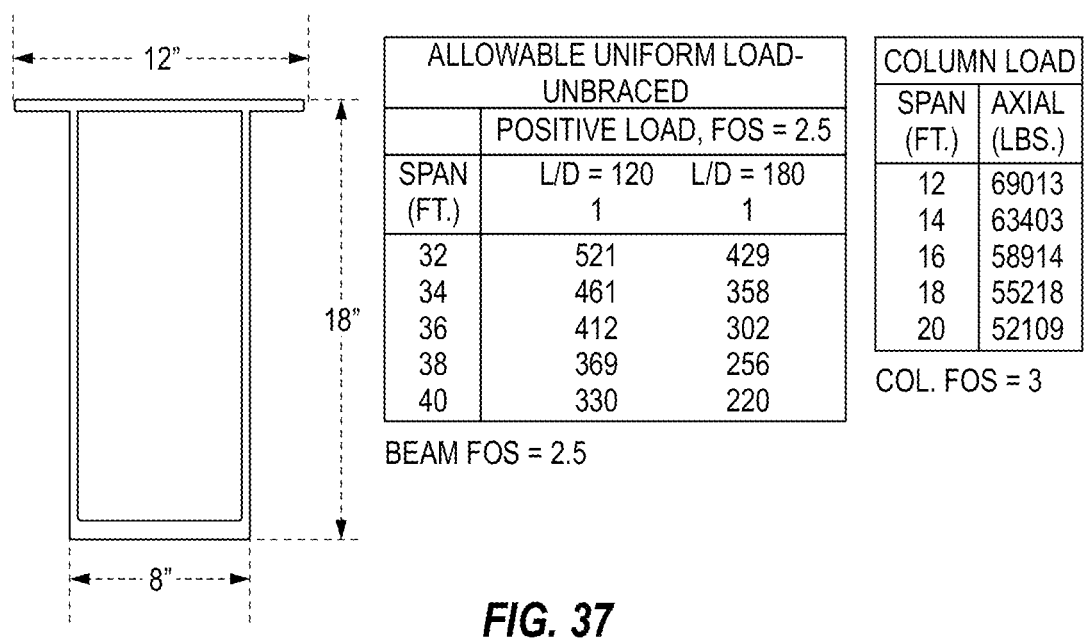
FIG. 37 depicts a shape of Tuff Span™ panel, 18F17 flanged tube.

In addition to the single profile and shapes shown below, Applicant offers a full line of Tuff Span™ FRP building panels along with FRP pultruded angles, channels, shapes, and flat sheet. Many of these sections may be used in the tank cover and baffle wall systems. FIG. 34 depicts a shape of Tuff Span™ panel, 7.2D×1.75 FR 450. FIG. 35 depicts a shape of Tuff Span™ panel, 8F6. FIG. 36 depicts a shape of Tuff Span™ panel, 12F12 flanged tube. FIG. 37 depicts a shape of Tuff Span™ panel, 18F17 flanged tube.

Table 3 shows FRP structural shapes.

TABLE 3

| Flanged Beams |
| --- |
| 6" × 6" × ⅜" Wide Flange |
| 8F6 Purlin/Girt |
| 12F12 Flanged Tube |
| 12S12 Flanged Tube |
| 18F17 Flanged Tube |
| Flat Sheet |
| 3' × 10' × ⅛" Thick |
| 3' × 10' × ³⁄₁₆" Thick |
| 3' × 10' × ¼" Thick |
| 3' × 10' × ⅜" Thick |
| 3' × 10' × ½" Thick |
| 4⅝' × 10' × ¼" Strip |
| Channel |
| 2" × 1" × ³⁄₁₆" |
| 3" × 1" × ³⁄₁₆" |
| 4" × 1⅜" × ⁵⁄₃₂" |
| 4" × 1⅛" × ¼" |
| 4¾" × 3¼" × ¼" |
| 6" × 1⅝" × ⁵⁄₃₂" |
| 6" × 1⅝" × ³⁄₁₆" |
| 6" × 2" × ³⁄₁₆" |
| 6" × 1⅝" × ¼" |
| 6⅞" × 5⅜" × ¼" |
| 8" × 1¾" × ⁵⁄₁₆" |
| 10" × 2¾" × ⅜" |
| Angle |
| 2" × 2" × ¼" |
| 3" × 3" × ¼" |
| 3" × 3" × ⅜" |
| 4" × 4" × ⅜" |
| 6" × 6" × ⅜" |
| Solid Rod |
| 1" × ⅛" Square |
| 1" × ⅛" Round |
| Square Tube |
| 1⅝" × 1⅝" × ⅛" |
| 2" × 2" × ¼" |
| 3" × 3" × ¼" |
| 4" × 4" × ¼" |
| Round Tube |
| 2⅜" × ¼" |
| Rectangular Tube |
| 3" × 4" × ¼" |

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cover assembly comprising a lock channel, and a panel on each longitudinal side of the lock channel wherein a plurality of connections attach each panel to the lock channel and wherein the panels are flush mounted with respect to each other and wherein the connections are removable such that the lock channel and panels can be dissembled and re-assembled;
   wherein the lock channel is configured to fit into a recessed portion of each of the panels and wherein the recessed portions of the panels include a channel nut.

2. The cover assembly according to claim 1, wherein the plurality of connections comprises a set of fasteners.

3. The cover assembly according to claim 2, wherein the set of fasteners are disposed at opposite ends of the lock channel to attach the lock channel to each of the panels.

4. The cover assembly according to claim 1, wherein the panels have a length and wherein the lock channel spans the length of the panels.

5. The cover assembly according to claim 1, wherein the channel nut in the recessed portions of the panels is configured to receive a fastener from the set of fasteners and secure the lock channel to each panel.

6. The cover assembly according to claim 2, wherein each fastener is disposed in respective recessed portions of the panels.

7. A cover assembly comprising a lock channel, a panel on each side of the lock channel fastened by one or more connections, and a support beam;
   wherein a fastener is configured to attach a flashing to the support beam;
   wherein a channel nut is configured to receive a fastener to attach a strut to the panels on each side of the lock channel and wherein the strut is attached to the support beam via the fastener; and
   wherein the channel nut is disposed between the flashing and the support beam.

8. The cover assembly according to claim 7, wherein the flashing is at a middle portion of the support beam.

9. The cover assembly according to claim 7, wherein the fastener is disposed between the panels.

10. The cover assembly according to claim 7, wherein the channel nut is disposed between the panels.

11. The cover assembly according to claim 7, wherein the flashing is between opposing ends of the panels.

12. The cover assembly according to claim 7, wherein the strut is disposed between the panels.

13. The cover assembly according to claim 7, wherein the flashing, the lock channel, or both are tapered.

14. The cover assembly according to claim 13, wherein the fastener is a recessed fastener that is not elevated more than 0.25 inches from the flashing and panel.

15. The cover assembly according to claim 14, wherein the recessed fasteners is configured to fasten through an enlarged hole and engage with a recessed washer.

16. A cover assembly comprising a lock channel, opposing panels on each longitudinal side of the lock channel wherein the panels are mounted to the lock channel with one or more fasteners and one or more corresponding nuts wherein the panels are mounted flush with respect to each other and wherein the lock channel is configured to fit into a recessed portion of each of the panels and wherein the recessed portions of the panels include a channel nut.

\* \* \* \* \*